(12) United States Patent
Heinla

(10) Patent No.: US 11,138,545 B2
(45) Date of Patent: Oct. 5, 2021

(54) SYSTEM AND METHOD FOR SECURELY DELIVERING PACKAGES TO DIFFERENT DELIVERY RECIPIENTS WITH A SINGLE VEHICLE

(71) Applicant: Starship Technologies OÜ, Tallinn (EE)

(72) Inventor: Ahti Heinla, Tallinn (EE)

(73) Assignee: Starship Technologies OÜ, Tallinn (EE)

( * ) Notice: Subject to any disclaimer, the term of this patent is extended or adjusted under 35 U.S.C. 154(b) by 242 days.

(21) Appl. No.: 16/430,013

(22) Filed: Jun. 3, 2019

(65) Prior Publication Data
US 2019/0287051 A1 Sep. 19, 2019

Related U.S. Application Data

(63) Continuation of application No. PCT/EP2017/080720, filed on Nov. 28, 2017, and a
(Continued)

(30) Foreign Application Priority Data

Dec. 2, 2016 (EP) .................................... 16201961

(51) Int. Cl.
*G06F 7/00* (2006.01)
*G06Q 10/08* (2012.01)
(Continued)

(52) U.S. Cl.
CPC ............ *G06Q 10/083* (2013.01); *B25J 9/163* (2013.01); *B25J 9/1661* (2013.01); *B25J 9/1679* (2013.01);
(Continued)

(58) Field of Classification Search
CPC .... G06Q 10/083; G06Q 50/28; G06Q 10/087; B25J 9/163; B25J 9/1661; B25J 9/1679; G05D 1/021; G05D 2201/0216
(Continued)

(56) References Cited

U.S. PATENT DOCUMENTS 4,549,841 A 10/1985 Ishige
5,664,928 A 9/1997 Stauber
(Continued)

FOREIGN PATENT DOCUMENTS

WO WO 2011/035839 3/2011
WO WO 2017/156586 9/2017
WO WO 2017/196759 11/2017

OTHER PUBLICATIONS

Ackerman, "Startup Developing Autonomous Delivery Robots That Travel on Sidewalks," IEEE Spectrum, Nov. 2, 2015, XP055343599, retrieved from the Internet URL:http://spectrum.ieee.org/automation/robotics/industrial-robots/starship-technologies-autonomous-ground-delivery-robots.
(Continued)

*Primary Examiner* — Yolanda R Cumbess
(74) *Attorney, Agent, or Firm* — Womble Bond Dickinson (US) LLP

(57) ABSTRACT

A delivery system and method for delivering packages to multiple recipients uses a mobile robot having a delivery package space suitable for accommodating at least two packages, at least one package sensor configured to output first data reflective of the presence or absence of packages within with package space, at least one processing component configured to receive and process the package sensor's first data and at least one communication component configured to at least send and receive second data. The mobile robot travels to a first delivery location, permits a first recipient to access the package space, and identifies the first
(Continued)

recipient's package to the first recipient. The system and method use data from the package sensor to verify that the first recipient removed only his or her package, if other package(s) are also present. The mobile robot then travels to a second delivery location associated with a second recipient.

22 Claims, 9 Drawing Sheets

Related U.S. Application Data continuation of application No. 15/367,249, filed on Dec. 2, 2016, now Pat. No. 9,741,010.

(51) Int. Cl.
*B25J 9/16* (2006.01)
*G05D 1/02* (2020.01)
*G06Q 50/28* (2012.01)

(52) U.S. Cl.
CPC ........... *G05D 1/021* (2013.01); *G06Q 10/087* (2013.01); *G06Q 50/28* (2013.01); *G05D 2201/0216* (2013.01)

(58) Field of Classification Search
USPC .................. 700/213–216, 228; 705/330
See application file for complete search history.

(56) References Cited

U.S. PATENT DOCUMENTS

| | | | |
|---|---|---|---|
| 5,942,869 | A | 8/1999 | Katou et al. |
| 6,467,293 | B1 | 10/2002 | Goosman |
| 6,602,037 | B2 | 8/2003 | Winkler |
| 7,073,634 | B2 | 7/2006 | Mitchell et al. |
| 7,894,939 | B2 | 2/2011 | Zini et al. |
| 7,931,431 | B2 | 4/2011 | Benedict et al. |
| 8,485,285 | B2 | 7/2013 | Ferrigni |
| 8,948,914 | B2 | 2/2015 | Zini et al. |
| 9,020,632 | B2 | 4/2015 | Naylor |
| 9,031,692 | B2 | 5/2015 | Zhu |
| 9,244,147 | B1 | 1/2016 | Soundararajan et al. |
| 9,256,852 | B1 | 2/2016 | Myllymaki |
| 9,266,675 | B2 | 2/2016 | Yamashita |
| 9,373,149 | B2 | 6/2016 | Abhyanker |
| 9,557,740 | B2 | 1/2017 | Crawley |
| 9,561,941 | B1 | 2/2017 | Watts |
| 9,630,619 | B1 | 4/2017 | Kentley et al. |
| 9,682,481 | B2 | 6/2017 | Lutz et al. |
| 9,694,976 | B1 | 7/2017 | Wurman et al. |
| 9,791,557 | B1 | 10/2017 | Wyrwas et al. |
| 9,844,879 | B1 | 12/2017 | Cousins et al. |
| 10,248,120 | B1* | 4/2019 | Siegel .................. G05D 1/0223 |
| 10,303,171 | B1* | 5/2019 | Brady .................. G08G 1/207 |
| 2003/0165373 | A1 | 9/2003 | Felder et al. |
| 2005/0165550 | A1 | 7/2005 | Okada |
| 2006/0237239 | A1 | 10/2006 | Bruner et al. |
| 2012/0090110 | A1 | 4/2012 | Van Den Berg et al. |
| 2013/0110281 | A1 | 5/2013 | Jones et al. |
| 2013/0332021 | A1 | 12/2013 | Goren |
| 2014/0081445 | A1 | 3/2014 | Villamar |
| 2014/0136414 | A1 | 5/2014 | Abhyanker |
| 2014/0254896 | A1 | 9/2014 | Zhou et al. |
| 2014/0365258 | A1 | 12/2014 | Vestal et al. |
| 2015/0006005 | A1* | 1/2015 | Yu .......................... G06Q 50/28 701/22 |
| 2015/0045945 | A1 | 2/2015 | Zini et al. |
| 2015/0100152 | A1 | 4/2015 | Barragán Treviño et al. |
| 2015/0183581 | A1 | 7/2015 | Worsley |
| 2015/0227882 | A1 | 8/2015 | Bhatt |
| 2015/0379468 | A1 | 12/2015 | Harvey |
| 2016/0033966 | A1 | 2/2016 | Farris et al. |
| 2016/0068264 | A1 | 3/2016 | Ganesh et al. |
| 2016/0148440 | A1 | 5/2016 | Kwak |
| 2016/0185466 | A1 | 6/2016 | Dreano, Jr. |
| 2016/0207710 | A1 | 7/2016 | Conrad et al. |
| 2016/0239798 | A1 | 8/2016 | Borley et al. |
| 2016/0325928 | A1 | 11/2016 | Lepek |
| 2016/0355337 | A1 | 12/2016 | Lert et al. |
| 2016/0368464 | A1 | 12/2016 | Hassounah |
| 2017/0017237 | A1 | 1/2017 | Tokuyama et al. |
| 2017/0032315 | A1 | 2/2017 | Gupta et al. |
| 2017/0100837 | A1 | 4/2017 | Zevenbergen et al. |
| 2017/0185853 | A1 | 6/2017 | Yokota et al. |
| 2017/0220981 | A1 | 8/2017 | Shucker et al. |
| 2017/0267452 | A1 | 9/2017 | Goren et al. |
| 2017/0364074 | A1 | 12/2017 | Lau et al. |
| 2017/0368684 | A1 | 12/2017 | Zevenbergen et al. |
| 2018/0005169 | A1 | 1/2018 | High et al. |
| 2018/0020896 | A1 | 1/2018 | High et al. |
| 2018/0024554 | A1* | 1/2018 | Brady ................ G06Q 10/0837 701/23 |
| 2018/0079626 | A1 | 3/2018 | Brady et al. |
| 2018/0356823 | A1* | 12/2018 | Cooper .................. G01C 21/20 |

OTHER PUBLICATIONS

Anonymous, "Lieferroboter Starship: Klauen würde ich ihn nicht—Auto—Tagesspiegel," Nov. 29, 2015, retrieved from the Internet, URL: http://www.tagesspiegel.de/mobil/lieferroboter-starship-klauen-wuerde-ich-ihn-nicht/12647114.html.
Anonymous: "Radio-frequency identification," Wikipedia, pp. 1-19, Dec. 1, 2016, XP055343659, retrieved from the Internet URL:https://en.wikipedia.org/w/index.php?title+Radio-frequency_identification&oldid=752391280.
HowStuffWorks, "How UPS Works," YouTube, Mar. 9, 2007, retrieved from the Internet URL:https://www.youtube.com/watch?v=posk9nEKPGM.
Baker, "Automated Street Crossing for Assistive Robots," Proceedings of the 2005 IEEE, Jun. 28-Jul. 1, 2005.
Pettitt, Jeniece, "Forget delivery drones, meet your new delivery robot," Nov. 2, 2015, retrieved from the Internet, URL: https://www.cnbc.com/2015/11/02/forget-delivery-drones-meet-your-new-delivery-robot.html.
International Search Report dated Jan. 26, 2018, issued in PCT counterpart application (No. PCT/EP2017/080720).
Written Opinion dated Jan. 26, 2018, issued in PCT counterpart application (No. PCT/EP2017/080720).
Extended European Search Report dated Feb. 21, 2017, issued in EP counterpart application (No. 16201961.6).

* cited by examiner

SYSTEM AND METHOD FOR SECURELY DELIVERING PACKAGES TO DIFFERENT DELIVERY RECIPIENTS WITH A SINGLE VEHICLE

RELATED APPLICATIONS

This is a Bypass Continuation of International Application No. PCT/EP2017/080720, filed Nov. 28, 2017. Priority is claimed to (i) EP 16201961.6 filed Dec. 2, 2016, and to (ii) U.S. patent application Ser. No. 15/367,249 filed Dec. 2, 2016, now U.S. Pat. No. 9,741,010. The contents of the aforementioned applications are incorporated by reference in their entirety.

FIELD

The invention relates to delivery of packages by a mobile robot. More particularly, the invention relates to security measures for robotic package delivery.

BACKGROUND

The sector of delivery has been developing and growing with incredible speed in the last years. With the onset of online shopping, delivery became an essential part of everyday life. However, delivering to customer's doors or mailboxes incurs large costs, energy expenditures, carbon emissions and other undesirable effects. A large part of these effects can be attributed to so-called last mile delivery, or the last stretch of the way between the delivery origin location (often a large warehouse) and the end customer or delivery recipient. Some companies offer to deliver to a nearby location instead of directly delivering to the end customer. For example, DHL offers a network of "Packing Stations" combined with partner businesses where multiple packages for end customers living within a reasonable distance can be left. While this reduces the negative consequences of last mile delivery, the delivery recipient is inconvenienced as a result, as they must retrieve their package from some other location instead of receiving it at home. Furthermore, delivery is often restricted by normal working hours in a given country—it is uncommon to receive a package on the weekend (or on Sunday in some countries), or late in the evening.

All of those problems can be solved by introducing robotic delivery. A robot can run on electricity and require little energy, and it can also deliver at any time outside the normal working hours. Small robots operating on pedestrian walkways would not contribute to traffic and could efficiently take on last mile delivery. Several solutions for autonomous or semi-autonomous delivery are known already, as mentioned below.

U.S. Pat. No. 9,256,852 discloses a package delivery platform. An autonomous road vehicle is operative to receive destination information, and to drive to a destination based on the destination information. A package securing subsystem is attached to the autonomous road vehicle and comprises at least one securable compartment. Each securable compartment is operative to secure at least one package therein. Each securable compartment is associated with compartment access information. An access subsystem comprising at least one access information interface. The access subsystem is operative, upon receipt through the access information interface of compartment access information, to permit access to the compartment associated with the received compartment access information.

US patent application 2014/0254896 A1 describes a system and method for delivering mail and goods using a mobile robot drone system. The method may comprise self-moving the mobile robot drone system to a mail or goods receiving location. Itinerary to the mail or goods receiving location is determined based on itinerary data received from a GPS unit. In the location, the mobile robot drone system receives the mail or goods via a mail and goods compartment and then delivers the mail or goods to a predefined location. Based on user instructions, the mobile robot drone system electronically signs receipt verification documents or performs payment by displaying a payment barcode encoding user payment information. After delivering the mail or goods, the mobile robot drone system provides access to the mail and goods compartment.

U.S. Pat. No. 9,373,149 discloses an autonomous neighborhood vehicle controllable through a neighborhood social network. In one embodiment, an autonomous neighborhood vehicle can autonomously navigate to a destination specified by a user of the neighborhood social network. In one embodiment, a computer system of the autonomous neighborhood vehicle is communicatively coupled to the neighborhood social network through a wireless network to autonomously navigate to a destination specified by the user of the neighborhood social network. A navigation server provides a remote sensing capability to the autonomous neighborhood vehicle. A particular user of a third-party application is authenticated as being a verified user of the neighborhood social network having a verified residential address. An information of the particular user is communicated to the third-party application from the neighborhood social network based on a personal address privacy preference of the particular user.

The present invention is intended for parcel delivery robots that transport parcels to recipients. Such robots can travel in a public area (streets, sidewalks, parks) or a private area (warehouses, campuses, shopping malls), and they could be remotely operated, semi-autonomous or autonomous (self-driving). Such robots usually have one or multiple cargo compartments where parcels are stored during transport. The compartment(s) are usually locked during transport, and the intended recipient is able to open the compartment(s). It is advantageous that such robots carry more than one parcel at a time, usually delivering them to different recipients; on an average, this allows to deliver more parcels per distance travelled, reducing energy usage.

In some known prior art robots, each parcel is stored in a separate compartment. This is the most secure arrangement, since each compartment could be individually locked, and each recipient could have physical access to only the one compartment that stores the parcels intended for him/her. However, this has the disadvantage that each compartment needs to be sized to accommodate the maximum possible parcel size. Often, that maximum parcel size is many times larger than the average parcel size, leading to a large amount of wasted space in cargo compartments. This in turn leads to a large and heavy robot.

The present invention describes an alternative arrangement, where parcels intended for multiple recipients are stored in the same compartment; in one case, the robot only has a single cargo compartment, where all the parcels are stored. This allows to significantly reduce the total size and weight of the robot (often by a factor of 2 or more), leading to reduced energy usage for transporting parcels. Safety is also improved: a lighter robot will cause less damage when (unintentionally) colliding with a person or an object. However, in such robots, recipients have physical access to parcels not intended for them. Therefore, a recipient might take the wrong parcel, either intentionally (theft) or unintentionally (by mistake). Therefore, some technical measures are needed to reduce the chances of that happening. In this invention, a multitude of such measures are described, which could be used individually or in combination with each other.

SUMMARY

The present invention is specified in the claims as well as in the below description. Preferred embodiments are particularly specified in the dependent claims and the description of various embodiments.

In a first embodiment, the invention discloses a delivery method for delivering a first package to a first delivery recipient at a first delivery location. The method comprises providing a mobile robot comprising at least one package space containing at least first and second packages for delivery, at least one package sensor, at least one processing component and at least one communication component. The method further comprises the mobile robot travelling to the first delivery location and enabling access to the package space to the first delivery recipient. The delivery method also comprises identifying to the first delivery recipient the first package that the first delivery recipient is authorized to remove from the package space. The method further comprises verifying that the first delivery recipient only removed the first package, said verification performed using the at least one package sensor of the mobile robot. The method also comprises determining whether a second package intended for a second delivery recipient remains in the package space. The method further comprises the mobile robot travelling to a second delivery location only if the second package remains in the package space.

In a second embodiment, the invention provides a mobile robot adapted to at least securely deliver a first package to a first delivery recipient at a first delivery location. The mobile robot can comprise at least one package space configured to hold at least two packages. The mobile robot can further comprise at least one package sensor adapted to at least measure first data reflective of the presence or absence of at least one package. The mobile robot can also comprise at least one processing component adapted to at least receive the package sensor's first data and process it. The mobile robot can further comprise at least one communication component adapted to at least send and receive second data.

In some preferred embodiments, the package sensor can be adapted to measure first data relating to the package removed from the package space and/or first data relating to the packages within the package space. That is, such first data can comprise information about the contents of the package space and/or about the package that is no longer present within the package space. This first data can then be processed in order to ascertain that only the first package, that is, the correct package, has been removed from the package space. The correct or first package refers here to the package that the first delivery recipient is entitled to remove from the package space. That is, the package that is either addressed to them, and/or to a person within their household and/or business and/or to a person and/or business that has authorized the first delivery recipient to receive the package. Put differently, the first delivery recipient's package or the correct package refers to the package that is to be delivered to the specific address and/or person and/or business at which the first delivery recipient receives the package.

In some preferred embodiments, the package sensor can be adapted to measure first data reflective of the presence or absence of each of a plurality of packages in the package space, and also the identity of each such package by virtue of a package ID such as a barcode, a QR code or a similar code and/or other specific package characteristic such as dimensions, weight, visual characteristics, RF tags and so on. Thus, the processing component and/or a server that the robot is adapted to communicate with via its communication component, and thereby an operator at the initial terminal and/or at the remote terminal, will know which package(s) is/are in the package space, at any given instant.

In some preferred embodiments, the processing component of the mobile robot is adapted to determine whether only the first package has been removed from the package space. This can be done by processing the package sensor's first data directly on the robot, and is described below in more detail. Note, that in some embodiments, the processing component of the robot is adapted to process the package sensor's first data only superficially in order to forward it to external processing means, such as an external server.

In some preferred embodiments, the communication component of the mobile robot is adapted to communicate with at least one server. Preferably, the communication component exchanges second data relating to the robot's packages with the server. The server can be a remote server, a cloud server and/or a collection of servers. It can be adapted to process second data received from the robot's communication component and output commands for the robot, and/or contact a remote terminal that can then control the robot. This is described below in more detail. The communication component of the robot can send sensor data and/or second data received either directly from the robot's sensors and/or from the processing component of the robot.

In the present document, the terms "first data", "second data" and "sensor data" are used. The term "first data" refers to the data collected, obtained, extracted and/or measured by the package sensor. This first data can be related to the contents of the package space, that is, the packages present within it. This first data can also be related to the contents missing from the package space, that is, the ones that have been removed from the package space, for example by the delivery recipient. For example, in embodiments wherein the package sensor comprises a camera, first data can refer to camera images taken by said camera. The term "second data" refers to the data that the communication component can send and/or receive. This second data can comprise first data in some embodiments. Referring again to the example where the package sensor comprises a camera, the communication component can be adapted to send images taken by said camera. In this case, second data can comprise first data. Second data can also comprise processed and/or pre-processed data. For example, referring again to the same example, the processing component of the robot can be adapted to pre-process and/or to process first data from the camera (that the package sensor can comprise), that is, camera images. This can, for example, mean compressing the images, changing the colour scheme of the images, performing preliminary analysis of the images, and or adding certain tags to the images such as a date, a time, a location and so on. Then, the communication component can then send such pre-processed images to the server. This, then would also comprise second data. However, second data can also comprise information and/or commands that the server sends to the robot and that the communication component receives. Going back to the same example, the server can fully process the images taken by the camera (that the package sensor can comprise), reach a conclusion on whether the correct package has been retrieved, and send this information to the robot. In some embodiments, the server can also send a command to the robot, such as "start an alarm" or "flash the lights" in case an incorrect package has been removed, or "close the lock" or "depart the delivery location" in case the correct package has been removed. Therefore, the term "second data" can refer to a plurality of data types that the robot's communication component can send and receive, preferably to and from the remote server. The term "sensor data" can refer herein to data from other sensors that the robot can comprise. That is, in some embodiments, the robot comprises sensors such as a GPS component, a plurality of cameras, accelerometers, Lidar sensors, ultrasonic sensors and other sensors for autonomous and/or semi-autonomous navigation. The communication component can also send data from those other sensors. This data is referred to herein, for clarity reasons, as "sensor data".

In some embodiments, the robot's processing component is adapted to process sensor data (other than the package sensor) to determine subsequent course of action for the robot. That is, the processing component can be adapted to use the robot's sensor data to navigate to and from the delivery location, as well as control the delivering process itself. The sensors other than the package sensor that the mobile robot can comprise include but are not limited to at least one or more GPS modules, one or more visual modules such as cameras, one or more audio modules for two-way communication, one or more accelerometers, one or more gyroscopes, one or more compasses, one or more Time of Flight cameras, one or more ultrasonic sensors, one or more Lidar (light radar) components, one or more laser based sensors, one or more magnetometers, one or more stereo visual modules such as stereo cameras, one or more altitude sensors, and/or one or more odometers.

The steps of the delivery method as described in the first embodiment can also be performed in a different order. For example, the step of identifying the correct package to the delivery recipient among multiple packages can be performed before the step of the mobile robot travelling to a delivery location. This step, in fact, can be performed as soon as the mobile robot is loaded with packages, for example, by taking a picture of the package space with the packages inside it, indicating on the picture and/or image (if the picture is processed for example) which package belongs to the first delivery recipient, and sending the picture with such identification to the first delivery recipient (additionally or alternatively, the picture can be taken of the first package itself outside of the package space to indicate what it looks like, and/or the delivery recipient can be sent a generated image of what the package looks like). This can, for example mean that the correct package is highlighted on the image, or framed by a certain colour, or indicated with an arrow, or similarly indicated. This is advantageous, as the first delivery recipient can see, prior to the robot's arrival with the package, its exact arrangement within the robot and with respect to other packages within the robot's package space and the characteristics of the package, such as its shape, dimensions, and/or colour. Additionally or alternatively, each package can be provided with a certain visual and/or graphical identification making it easy to recognize for the first delivery recipient. For example, a package can be clearly marked with the name of the recipient, or, if privacy is a concern, with a certain graphical identifier such as a shape, a colour and/or a symbol. This visual and/or graphical identification or sign can then be sent to the first delivery recipient by the robot's communication component and/or by a server prior to package retrieval from the robot. This can be particularly advantageous if the package space is such that the packages can move within it during the robot's travel from an initial location to the first delivery location. In such cases, the final arrangement of different packages within the robot can be different than the one shown on the picture sent to the first delivery recipient, and it can be helpful to have an additional way of identifying the correct package. In some embodiments, the recipient can be sent only a graphical sign that identifies the package (that is, the sign is present on the package). In some embodiments, the recipient can be prompted to select such a sign themselves.

In some embodiments, the step of the robot travelling to a delivery location comprises the robot semi-autonomously and/or autonomously driving from an initial location to the first delivery location. That is, the robot can be adapted to autonomously navigate in an outdoor environment. In some embodiments, the robot can navigate autonomously between 50 to 99% of the total delivery time and/or of the total distance travelled. That is, the robot can navigate and travel autonomously for most of the way from an initial location to the first delivery location and be controlled by an operator terminal and/or an external operator for the rest of the time/distance. In some embodiments, such an operator terminal can be a remote operator. This can be particularly advantageous in hazardous situations, such as the robot crossing a street with car traffic, or the robot engaging with pedestrians and/or cyclists. The remote operator can, for example, receive sensor data from the robot, interpret it, and send the robot a command for further operation. In some embodiments, the remote operator can comprise a human operator. This can be advantageous, as humans can evaluate a situation quickly using multiple sensor input and resolve it, allowing the robot to continue operating autonomously. The remote operator can, for example, evaluate sensor data from the robot's sensors to determine whether it is safe to cross a car road. In another embodiment, the remote operator can engage with the robot's surroundings such as pedestrians, for example via a microphone and speakers. This can be particularly advantageous when a pedestrian and/or a cyclist and/or a driver is trying to interact with the robot, for example by touching it. In such cases, a remote operator can indicate that the robot is being surveyed and communicate with the pedestrian and/or cyclist and/or driver more effectively. When a hazardous or unusual setting is no longer present, the robot can switch back to an autonomous mode and continue autonomous navigation and travelling to its destination. Such a mode where the robot travels autonomously for some time and is being controlled by a remote operator for some time can be referred to as semi-autonomous mode, or semi-autonomous driving or semi-autonomous travel. In some embodiments, a remote operator may also be a server and/or a computation engine and can be referred to as a remote terminal.

In some embodiments, the step of enabling access to the package space of the robot and/or within the robot comprises automatically detecting that the delivery location has been reached and opening a lid. That is, the robot's sensors such as a GPS module can detect that the robot is within a certain threshold of the delivery location and automatically open the lid of the package space. Additionally or alternatively, an electronic lid present on or around the lid may be opened when the robot detects that the delivery location has been reached. That is, the robot's processing component can unlock the electronic lock automatically. This can be advantageous, as it saves time for the delivery recipient who can then access the package space directly. Additionally or alternatively, the robot can unlock the electronic lock and/or open the lid of the package space when receiving an "open" input. Such an input can, for example originate from the delivery recipient. As a specific example, consider the case where the delivery recipient has a personal computing device such as a mobile phone, a tablet, an electronic watch, electronic "smart" glasses, smart contact lenses and/or another computing device and gives an "open" input from such a personal computing device, for example via an app. Such an "open" input can comprise a command and/or a signal, and can, in practice, be a certain button within an app on the delivery recipient's personal device that sends the "open" signal to the robot. In some such embodiments, the delivery recipient can use the personal computing device to request the delivery by the robot, for example request delivery at a certain time and location. This can also be done via an app or another interface on the delivery recipient's personal computing device. This can be advantageous, as the delivery recipient can first approach the robot and then send the "open" signal to ensure that no unauthorized persons get access to the package space of the robot. Another advantage is that if the delivery recipient is for some reason unable to immediately approach the robot and remove their package, the package space will remain closed until the delivery recipient actively requests it to open. Additionally or alternatively, the robot can detect the vicinity of the delivery recipient, for example via the vicinity of their personal computing device. Additionally or alternatively, the "open" command or input can also originate from the remote terminal such as a remote operator. In this case, the remote terminal can detect that the robot has reached the desired delivery location and send the robot a command to unlock the electronic lock and/or to open the robot's lid. For example, the remote operator can observe that the robot approached a correct house at the delivery location and that a person is standing in front of said house, deducing that the person is the delivery recipient and sending the robot the command to provide access to the package space. In some embodiments, the remote operator can even address the person or persons they deem to be the delivery recipient in order to confirm their identity verbally, visually, via their personal computing device, and/or otherwise.

As specified above, the robot comprises a package sensor. Such a package sensor can comprise one or a combination of a plurality of sensors. In this document, the package sensor is referred to in the singular, but it can also comprise multiple sensors operating in concurrence and/or providing additional information and/or acting as failsafes in case one or more of the sensors that the package sensors comprises fails.

In some embodiments, the package sensor can be configured to measure first data reflective of the presence or absence of each of a plurality of packages in the package space, and the identity of each such package. That is, the package sensor can measure data which can be used to determine exactly which packages remain within the package space. Consequently, it can also be used to determine exactly which packages have been removed from the package space.

The package sensor can comprise one or more cameras. In such embodiments, the camera can be placed on the robot in such a way that the package space can be observed before and after the removal of the package by the first delivery recipient. The camera can then capture visual images of the package space, and, using image processing it can be determined whether the correct package has been extracted. This can either be done by the processing component of the robot, and/or by a server that receives images from the camera, and/or by a remote terminal such as a remote operator monitoring the process of package handover. In some embodiments, the camera can be placed on the lid of the robot. In other embodiments, the camera can be placed on the edge of the package space, or within it. There can be more than one camera to view the package space from multiple angles and provide more information concerning its contents. This can also be advantageous in case one of the cameras fails or becomes obscured.

The package sensor can comprise one or more RFID (Radio Frequency Identification) readers. In such embodiments, each package can comprise an RFID tag. The RFID tag can, for example, comprise a semiconductor chip with an antenna. The RFID reader can, for example, be an active reader. That is, the RFID reader can periodically send out radio frequency waves to its surroundings. The tags, which can be passive, can use the energy of the received radio waves to send back a response. Said response can comprise some data stored on the RFID tag. Note, that the reader can also be passive and the tags active, or both can be active (a mix is also possible, where, for example, a tag is passive, but comprises a battery for actively sending back replies). More concretely, the robot can comprise an RFID reader that periodically checks whether all of the packages are still within a certain distance from it, that is, still within the package space. This can be done by verifying whether all the packages respond to the signal sent out by the RFID reader. After providing access to the package space, the RFID reader can determine which package with its corresponding RFID tag has been removed, and pass on this information to the robot's processing component. The robot can then either process this itself, or forward the information via its communication component. This type of package sensor is particularly advantageous, as radio frequency identification allows for very fast information exchange without any visual input. That is, the orientation of packages within the package space has no effect on the RFID reader's ability to determine that they are there. Another advantage is that RFID allows for very precise identification, that is, the chance of misidentification is low. Further, as an RFID sensor only interacts with particular RFID tags, there is no privacy concern such as in the case of cameras, which can also capture the first delivery recipient. Finally, the location of the RFID sensor within or on the robot need not be in the vicinity or within the package space. As it operates using radio waves, an RFID sensor can be located whenever it is convenient to place it, and still be effective.

The package sensor can also comprise a weight sensor, or a scale. In such embodiments, the weight sensor can be implemented under the package space. The weight sensor can then periodically weigh the package space. For example, the weight sensor can weigh the package space while the robot is loaded with each of the packages to be delivered, and then weigh the package space whenever access to it is provided. In this way, the exact weight of each package can be measured and transmitted to the robot's processing component for further manipulation and/or storage. When the first delivery recipient removes a package, the weight sensor can measure the weight of the package space and determine whether the package with the correct weight has been removed. This can be advantageous, as a weight sensor is simple to implement and can provide relatively accurate results in a simple and efficient way. The weight sensor does not rely on visual input, which may become blocked by other packages and/or by objects in front of the lens, or on the proximity of the object to the robot like the RFID sensor. That is, a weight sensor can determine whether the correct package has been removed while still in the vicinity of the first delivery recipient.

The package sensor can also comprise a motion sensor. In such embodiments, the motion sensor can be built into the robot in such a way that when the first delivery recipient removes a package, this motion is detected. For example, the motion sensor can be built into the lid of the package space and/or into its walls, and/or placed on its edge. In some such embodiments, each package further comprises at least one package ID, such as a Barcode, a QR code, or the like. The first delivery recipient can be asked to scan such a package ID on their personal mobile device and/or on a scanner built into the robot. The robot and/or an external server can then determine whether the correct package has been removed. If the first delivery recipient reaches again into the package space, this motion can be detected by the motion sensor. If no subsequent package ID is scanned, or if a package ID belonging to a wrong package is scanned, the first delivery recipient can be prompted to return the incorrectly removed package, which can be detected by the motion sensor.

In some embodiments, the step of using first data from the package sensor to verify that the correct package has been removed comprises one or a combination of the following uses of different package sensors. The package space can be weighted with a weight sensor prior to and/or after the removal of the package by the first delivery recipient. Alternatively or additionally, a visual camera can take visual images of the package space prior to and after the removal of the package by the first delivery recipient. These visual images can be transferred to the robot's processing component. Additionally or alternatively, the visual images can be sent to a remote terminal such as a remote operator and/or to a computer vision system to identify whether the correct package has been removed. Additionally or alternatively, the package space can be prompted or scanned with an RFID scanner that is preferably equipped on the mobile robot and/or within it. In such embodiments, the RFID scanner can determine whether the package with the correct RFID tag has been removed. Additionally or alternatively, motion within the package space or around it can be detected with a motion sensor to indicate that the first delivery recipient retrieved a parcel. The first delivery recipient can then be prompted to scan a package ID such as a barcode or a QR code or the like to verify that the correct package has been removed. This can be done via the first delivery recipient's personal computing device and/or via the robot itself using an integrated scanner. As noted above, the package sensor can be a combination of several sensors operating under different principles. Similarly, the step of using first data from the package sensor to verify whether the correct package has been removed can be a combination of using a plurality of sensors in different ways to confirm with a higher likelihood whether the correct package has been removed.

In some embodiments, the first data obtained by the package sensor is then processed by the robot's processing component. The processing component can comprise a system on a chip, a standard CPU and/or GPU or a combination thereof. A person skilled in the art will recognize that the robot can utilize a plurality of widely available processing components similar to the ones in personal computing devices (such as mobile phones, tablets and the like), and/or utilize a custom processing component better adapted to the robot's uses. The processing component can then process the first data obtained from the package sensor to determine or verify whether the correct package has been removed from the package space. The result of such processing can comprise a probabilistic evaluation for example. In such embodiments, the processing component may determine that if the probability of the wrong or unauthorized package being removed exceeds a certain value, it is to be assumed that the wrong package has been removed. In such embodiments, the robot can self-sufficiently assess the available first data and conclude that the first delivery recipient removed the wrong package. This can be advantageous, as the mobile robot can locally process the first data without sending it to a remote server or such and potentially speed up the verifying process. Additionally, it removes the need to centrally coordinate the delivery process by a remote server, leading to a system capable of modular functioning. Even further, if, for some reason, the robot's communication component is not operative during the package handover, the robot can still verify that the correct package has been removed. For example, in embodiments where the communication component comprises one or more SIM cards or modems or network devices, one or more of them could lose connectivity at the point of package handover, which would lead to the robot's inability to send and receive second data related to packages. Therefore, it can be particularly advantageous to have the robot locally evaluate the package sensor's first data.

In other preferred embodiments, the robot's communication component can be adapted to exchange second data with a remote server. In such embodiments, the communication component can, for example, send the first data collected or obtained by the package sensor to a remote server to be analysed (which is referred to as "second data" when sent by the communication component, as discussed above). The remote server can then analyse said second data and determine whether the correct package has been removed from the package space. This can be particularly advantageous in embodiments where the remote server has more computational resources than the robot's processing component. In such embodiments, the remote server can evaluate the package sensor's first data faster and/or more reliably. In some embodiments, this is also done in a probabilistic manner, as described above. That is, in some embodiments, the server can compute the probability of a wrong package having been removed from the package space. If said probability exceeds a certain threshold, the server can determine that the wrong package has been removed. The server can then send the result of this verification and/or computation to the robot's communication component. The server can also send a certain command to the robot based on the package sensor's first data. This command can relate to the further course of action. For example, if the server determines that the correct package has been removed, the command can comprise commanding the mobile robot to depart from the delivery location and proceed with further deliveries and/or return to an initial location if all planned delivery locations have been visited. If the server determines that an incorrect package has been removed, the command can comprise informing the first delivery recipient of unauthorized package removal, as described below.

In some other preferred embodiments, the robot's communication component can be adapted to exchange second data with an operator terminal or remote operator. This can be done either directly, or via the remote server. As described above, the remote operator can comprise a person that can control the robot during its semi-autonomous operation. In some embodiments, the remote operator can also supervise the process of delivery handover. That is, the remote operator can receive first data from the robot's package sensor (sent by the communication component, and referred to as "second data" then) and determine whether the correct package has been retrieved. This can be advantageous, as it can be faster and more efficient for a human to evaluate the package sensor's first data. It can also be advantageous, as a human can react faster to unforeseen or unexpected situations, such as the first delivery recipient interfering with the package sensor and/or with the robot and/or with the packages. The remote operator can also send a command and/or a transmission to the mobile robot via its communication component. This command can be as described above, that is a command to depart the present delivery location and/or a command to engage the first delivery recipient and inform them that the wrong package has been removed as described below. The transmission from the remote operator can comprise directly engaging the first delivery recipient via the robot's two-way audio communication components such as speakers and a microphone for example.

Note, that a combination of the robot's processing component, remote server and a remote operator evaluating the package sensor's first data is also possible. For example, the robot's processing component can roughly pre-process the package sensor's data before sending it out, and the server could do a fine analysis. Other combinations are also possible, particularly in cases where it cannot be clearly determined whether the correct package has been removed. For example, if the robot cannot determine with a sufficiently high probability that a correct package has been removed, it can send a request to the server and/or to the remote operator to verify the package sensor's first data and/or to engage the first delivery recipient in order to obtain further data.

In some embodiments, the delivery method further comprises the step of informing the first delivery recipient that they removed a wrong package (that is, a package they are not authorized to remove, e.g. the second package addressed to the second delivery recipient) if the package sensor outputs that a wrong package has been removed. That is, when the robot's processing component and/or an external server and/or a remote operator receives output from the package sensor indicating that the wrong package has been removed, this can trigger either an automatic or a semi-automatic or a manual response. For example, the robot can emit a visual signal such as a light pattern and/or an audio signal such as a warning tone or an alarm indicating to the delivery recipient that an incorrect package has been retrieved. A recorded message could also be played in embodiments where the robot comprises speakers or a similar audio device. Additionally or alternatively, a remote server can send a message such as a text message or a notification to the first delivery recipient's mobile device indicating that the wrong package has been retrieved. Additionally or alternatively, the remote server and/or the remote operator can use the mobile robot to communicate with the first delivery recipient. For example, in some preferred embodiments, the robot comprises speakers. In such embodiments, an audio message could be played from them indicating that the wrong package has been retrieved. In embodiments where the operator terminal comprises a human, they can engage directly with the first delivery recipient through the robot's speakers and/or additionally a microphone. Additionally or alternatively, an automatic or a manual call could be placed on the first delivery recipient's personal computing device to inform them of unauthorized package removal.

In some preferred embodiments, if it has been determined that the second package is not in the package space, the method can further comprise prompting the first delivery recipient to return the second package to the package space. This can be done, for example, using the methods described above. The method can further comprise determining whether the second package has been returned to the package space. That is, the robot and/or the server and/or the remote operator can attempt to communicate with the first delivery recipient in order to recover the second package. During and/or after such attempts, the package sensor can measure further first data, and it can be determined whether the second package has been returned to the package space. This can be particularly advantageous, as the first delivery recipient could have taken the wrong package by mistake and would return it after prompting. In this case, the robot and/or the server and/or the remote operator can determine that the second package is present in the package space, and continue on to the second delivery recipient.

The robot will know and/or check whether there is a second package in the package space, which is to be delivered to a second delivery recipient at a second delivery location. If the second package for the second delivery recipient is present in the package space, the robot proceeds to the second delivery location to deliver the second package. If, however, the first delivery recipient has erroneously taken the second delivery recipient's package and this has not been corrected as described above, the robot will not proceed to the second delivery location since there is no second package to be delivered to the second recipient.

In some preferred embodiments, the initial location that the robot departs from to the first delivery location can comprise a hub. A hub can be any structure adapted to house, service, maintain, recharge and/or load the robot. The hub can comprise, for example a storage container. The hub can also comprise a warehouse, a garage, or a specific space within a business. The hub can also be mobile and comprise a truck or a trailer. The robot can be loaded with packages within the hub and then departs to various delivery locations from it. The robot can then return to the hub. Alternatively, the robot can return to a different hub.

In some embodiments, the processing component of the mobile robot can be further configured to navigate the mobile robot to a first delivery location. This can be done using a plurality of sensors attached to the robot and/or saved map data of the robot's path and/or external instructions from the server and/or from the operator terminal. The processing component can be further configured to enable access to the package space to the first delivery recipient. That is, the package space can be covered by a lid secured with an electronic lock. The processing component can be adapted to lock and/or unlock said lock upon reaching the first delivery location and/or upon some other external command and/or preprogramed circumstances. The processing component can be further configured to identify to the first delivery recipient the first package that the first delivery recipient is authorized to remove from the package space. This can be done, for example, by sending the first delivery recipient an image of the package space with their package identified, an image of their package itself, and/or a graphical sign that is present on the package. The processing component can further be configured to verify that the first delivery recipient only removed the first package using the package sensor. That is, the processing component can process the package sensor's data to determine which package has been removed and/or the remaining contents of the package space. Note, that in some other embodiments, any of the tasks described in the above paragraph can also be performed by the server and/or by the remote operator.

In some embodiments, the processing component of the mobile robot can be further configured to determine whether a second package intended for a second delivery recipient remains in the package space. As mentioned above, this refers to the processing component using the package sensor data to determine the presence and/or absence of the second package. The processing component can be further configured to navigate the mobile robot to the second delivery location only if the second package is present in the package space. That is advantageous, as if the second package is no longer present in the package space, the mobile robot should not proceed to the second delivery location. In this case, the mobile robot can be adapted to reject planned travel to a second delivery location and/or receive a communication from the server and/or from the remote operator concerning further course of action. If there are further packages present in the package space, the mobile robot can proceed to further delivery locations to deliver them. If not, the mobile robot can return to an initial location and/or proceed to a final location (such as, for example a storage, maintenance and/or reloading place such as a hub). As above, the tasks and functions described in this paragraph can be performed partially and/or completely by the server and/or by the remote operator in some other embodiments. Note, that in the present text, "remote operator", "external operator" and "operator terminal" are used interchangeably and can refer to the same element.

In some embodiments, the processing component can be further configured to prompt the delivery recipient to return the second package and to use further first data obtained by the package sensor to determine whether the second package has been returned to the package space. As described above, this is useful in case the first delivery recipient mistakenly takes the second package and returns it upon prompting.

It is understood from the foregoing that the package sensor can be adapted to measure first data reflective of the presence or absence of each of a plurality of packages in the package space, and the identity of each such package by virtue of a package ID such as a barcode, a QR code or a similar code and/or other specific package characteristic such as dimensions, weight, visual characteristics, RF tags and so on. Thus, the processing component and/or a server that the robot is adapted to communicate with via its communication component, and thereby an operator at the initial terminal and/or at the remote terminal, will know which package(s) is/are in the package space, at any given instant.

Note, that in the present document, the terms "first package" and "second package" are used in the singular to refer to the respective packages that the mobile robot can deliver to the respective delivery recipients. However, it is entirely possible that a plurality of packages is addressed to one delivery recipient. Therefore, it is implied that "first package" can, in fact, refer to a plurality of packages all addressed to the first delivery recipient (or at least that the first delivery recipient is authorized to remove from the robot's package space). The same applies to the "second package".

As used in the present document, the word "package" can refer to any deliverable item. That is, the package can comprise mail, parcels, groceries, purchases, plants, flowers, take-out or the like.

Below, further numbered embodiments of the invention will be discussed.

1. A mobile robot delivery method for delivering a first package (20) to a first delivery recipient (60) at a first delivery location, the method comprising:
   a. providing a mobile robot (1) comprising package space (10) containing at least first and second packages (20, 22) for delivery, at least one package sensor (30), at least one processing component (3) and at least one communication component (5); and
   b. the mobile robot (1) travelling to the first delivery location; and
   c. enabling access to the package space (10) to the first delivery recipient (60); and
   d. identifying to the first delivery recipient (60) the first package (20) that the first delivery recipient (60) is authorized to remove from the package space (10); and
   e. verifying that the first delivery recipient (60) only removed the first package (20) using the at least one package sensor (30); and
   f. determining whether a second package (22) intended for a second delivery recipient remains in the package space (10); and
   g. the mobile robot (1) travelling to a second delivery location only if the second package (22) remains in the package space (10).

2. A method according to the preceding embodiment wherein the step of travelling to a first delivery location comprises the mobile robot (1) semi-autonomously and/or autonomously driving from and initial location to the first delivery location.

3. A method according to any of the preceding embodiments wherein the step of enabling access to the package space (10) comprises at least one or a combination of automatically detecting that the first delivery location has been reached and opening a lid (40), and/or unlocking at least one electronic lock (50), and/or opening the lid (40) and/or unlocking the at least one electronic lock (50) when receiving an open input and/or command and/or signal from the first delivery recipient (60) and/or from a remote terminal (120).

4. A method according to any of the preceding embodiments further comprising at least one or more of)
   (i) sending the first delivery recipient (60) an image of the package space (10) with the first package (20) clearly indicated and/or identified;
   (ii) sending the first delivery recipient (60) an image of the first package (20); and
   (iii) visually identifying the first package (20) with a graphical sign and communicating said sign to the first delivery recipient (60).

5. A method according to any of the preceding embodiments wherein the step of using the package sensor (30) to verify that only the first package (20) has been removed comprises at least one or more of:
   (i) weighing the package space (10) with a weight sensor prior to and/or after the removal of the package (20, 22) by the first delivery recipient (60);
   (ii) taking visual images of the package space (10) with a visual camera prior to and after the removal of the package by the first delivery recipient (60) and transferring visual images to a remote terminal and/or to a computer vision system to identify whether the correct package has been removed;
   (iii) scanning the package space (10) with an RFID scanner equipped on the mobile robot (1) to determine whether only the first package (20) has been removed based on its RFID tag; and (iv) detecting motion within the robot's package space (10) with at least one motion sensor.

6. A method according to any of the preceding embodiments wherein step e. further comprises requesting the first delivery recipient (60) to scan a package ID (32) on the first package (20), preferably a barcode and/or a QR code, preferably by a mobile device such as a smartphone, tablet, wearable device and/or a comparable device.

7. A method according to any of the preceding embodiments wherein the processing component (3) of the robot (1) is adapted to perform the step of verifying whether only the first package (20) has been removed from the package space (10) using at least first data obtained by the package sensor (30).

8. A method according to any of the preceding embodiments wherein the communication component (5) of the robot (1) is adapted to send first data obtained by the package sensor (30) to a server (70), and wherein the server (70) is adapted to analyze said first data to verify whether only the first package (20) has been removed from the package space (10).

9. A method according to any of the preceding embodiments wherein the communication component (5) of the robot (1) is adapted to send first data obtained by the package sensor to a remote terminal (120), and wherein the remote terminal (120) is adapted to determine whether only the first package (20) has been removed from the package space (10).

10. A method according to any of the preceding embodiments further comprising the step of e1. Informing the first delivery recipient (60) that they removed a wrong package (22) if the package sensor (30) outputs first data indicating that the second package (22) has been removed by the first delivery recipient.

11. A method according to the preceding embodiment wherein informing the first delivery recipient (60) comprises at least one or more of:
(i) activating an alarm, and/or playing a recorded message, and/or sending a text message to a first delivery recipient's mobile device;
(ii) calling the first delivery recipient's mobile device and playing a recorded message;
(iii) calling the first delivery recipient's mobile device and connecting them with an operator terminal (120); and
(iv) activating a speaker on the first delivery recipient's mobile device through which an operator terminal (120) can communicate with the first delivery recipient (60).

12. A method according to any of the preceding embodiments and with features of embodiment 10, further comprising prompting the first delivery recipient (60) to return the second package (22) to the package space (10) and determining whether the second package (22) has been returned to the package space (10).

13. A method according to any of the preceding embodiments further comprising, upon determining that the second package (22) has been removed from the package space (10) by the first delivery recipient (60),
(i) prompting the first delivery recipient (60) to return the second package (22) and
(ii) determining, via the package sensor (10), whether the second package (22) has been returned to the package space (10).

14. A mobile robot (1) adapted to securely deliver a first package (20) to a first delivery recipient (60) at a first delivery location, comprising:

a. at least one package space (10) configured to hold at least two packages (20, 22); and
b. at least one package sensor (30) configured to at least measure first data reflective of the presence or absence of at least one package; and
c. at least one processing component (3) configured to at least receive the package sensor's (30) first data and process it; and
d. at least one communication component (5) configured to at least send and receive second data.

15. A mobile robot according to the preceding embodiment wherein the package sensor (30) is adapted to measure first data relating to the package (20, 22) removed from the package space (10) and/or first data relating to the packages (20, 22) within the package space (10).

16. A mobile robot (1) according to any of the preceding embodiments wherein the at least one package sensor (30) is configured to measure first data reflective of the presence or absence of each of a plurality of packages in the package space, and the identity of each such package.

17. A mobile robot (1) according to any of the preceding embodiments wherein the processing component (3) is adapted to determine whether only the first package (20) has been removed from the package space (10).

18. A mobile robot (1) according to any of the preceding embodiments wherein the communication component (5) is adapted to communicate with at least one server (70), preferably to exchange second data relating to the robot's packages (20, 22).

19. A mobile robot (1) according to the preceding embodiment wherein the communication component (5) is adapted to send package sensor's first data to the server (70) and wherein the server (70) is adapted to determine whether only the first package (20) has been removed from the package space (10) and send the result of said determination to the robot's communication component (5).

20. A mobile robot (1) according to the preceding embodiment wherein the server (70) is further adapted to send at least one command to the mobile robot (1) via its communication component (5), said command based at least partially on the package sensor's (30) first data.

21. A mobile robot (1) according to any of the preceding embodiments wherein the communication component (3) is adapted to exchange package sensor (30) first data with at least one remote terminal (120) and wherein the remote terminal (120) is adapted to determine whether only the first package (20) has been removed from the package space (10).

22. A mobile robot (1) according to the preceding embodiment wherein the processing component (5) is adapted to receive at least one command and/or transmission from the remote terminal (120) via the communication component (3).

23. A mobile robot (1) according to any of the preceding embodiments wherein the package sensor (30) comprises at least one camera adapted to at least take visual images of the package space (10).

24. A mobile robot (1) according to any of the preceding embodiments wherein the package sensor (30) comprises at least one RFID (Radio Frequency Identification) reader and each of the packages (20, 22) comprises at least one RFID tag.

25. A mobile robot (1) according to any of the preceding embodiments wherein the package sensor (30) comprises at least one weight sensor adapted to at least weight the contents of the package space (10).

26. A mobile robot (1) according to any of the preceding embodiments wherein the package sensor (30) comprises at least one motion sensor and each package (20, 22) comprises at least one package ID (32), preferably at least one barcode and/or at least one QR code and/or at least one comparable code.

27. A mobile robot (1) according to any of the preceding embodiments wherein the processing component (3) is adapted to determine whether the first delivery recipient (60) retrieved the wrong package (22) and take an action based on this.

28. A mobile robot (1) according to the preceding embodiment wherein the processing component (3) and/or a server (70) that the robot (1) is adapted to communicate with via its communication component (5) is adapted to do one or more of:
- (i) activating an alarm;
- (ii) playing a recorded message;
- (iii) sending a communication such as a text message to a first delivery recipient's mobile device such as a smartphone, tablet, wearable device and/or a comparable device via the communication component (5),
- (iv) calling the first delivery recipient's mobile device and playing a recorded message,
- (v) calling the first delivery recipient's mobile device and connecting them with a remote terminal (120) directly, and
- (vi) activating a speaker through which a remote terminal (120) can communicate with the first delivery recipient (60) via the mobile robot's (1) communication component (5).

29. A mobile robot (1) according to any of the preceding embodiments wherein the mobile robot (1) and/or a server (70) that the robot (1) is adapted to communicate with via its communication component (5) is adapted to identify the first package (20) to the delivery recipient (60).

30. A mobile robot (1) according to the preceding embodiment, wherein the identification comprises sending an image of the package space (10) with the first package (20) indicated to the first delivery recipient (60).

31. A mobile robot (1) according to embodiment 29, wherein the identification comprises sending the first delivery recipient (60) an image of the first package (20).

32. A mobile robot (1) according to embodiment 29, wherein the identification comprises visually identifying the correct package with a graphical sign and communicating said sign to the first delivery recipient (60).

33. A mobile robot (1) according to any of the preceding embodiments, wherein the processing component (3) is further configured to:
- (i) navigate the mobile robot to a first delivery location;
- (ii) enable access to the package space (10) to the first delivery recipient (60);
- (iii) identify to the first delivery recipient (60) the first package (20) that the first delivery recipient (60) is authorized to remove from the package space (10); and
- (iv) verify that the first delivery recipient (60) only removed the first package (20) using the at least one package sensor (30).

34. A mobile robot (1) according to any of the preceding embodiments, wherein the processing component (3) is further configured to:
- determine whether a second package (22) intended for a second delivery recipient remains in the package space (10); and
- navigate the mobile robot (1) to the second delivery location only if the second package (22) is still in the package space (10).

35. A mobile robot (1) according to any of the preceding embodiments, wherein upon determining that the second package (22) has been removed from the package space (10), the processing component (3) is further configured to prompt the first delivery recipient (60) to return the second package (22) and to use further first data obtained by the package sensor (30) to determine whether the second package (22) has been returned to the package space (10).

The above features along with additional details of the invention, are described further in the examples below, which are intended to further illustrate the invention but are not intended to limit its scope in any way.

DESCRIPTION OF VARIOUS EMBODIMENTS

Figure 1A:
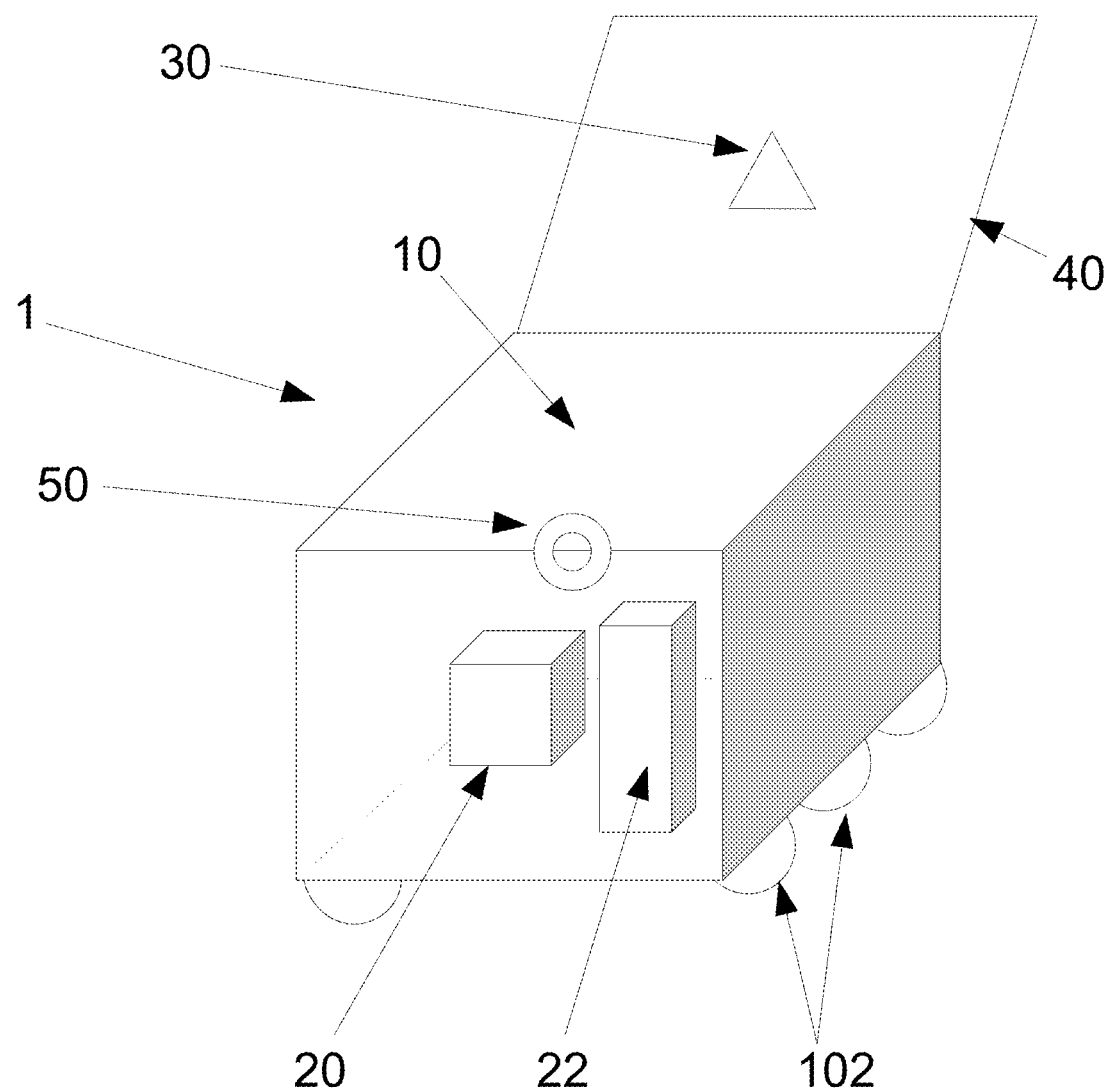
FIG. 1a, 1b, 1c, 1d depict embodiments of the mobile robot according to one embodiment of the invention.

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps.

FIGS. 1a, 1b, 1c, and 1d depict embodiments of a mobile robot 1 according to one aspect of the invention. The mobile robot 1 comprises wheels 102 adapted to drive the mobile robot 1 at least to and from delivery locations. In the depicted embodiment, the robot 1 comprises six wheels 102, but the number can be variable. The mobile robot 1 can also comprise 3, 4, 5, 7, 8 or more wheels.

The mobile robot 1 further comprises at least one package space 10. The package space 10 is depicted as a substantially rectangular box or cube, but it does not need to be. In some embodiments, the package space 10 can comprise rounded edges or comprise other shapes. The package space 10 can comprise, for example, a basket placed within a cavity of the robot 1. This can be advantageous to allow fast loading and unloading of the robot 1. The package space 10 can also comprise a compartment, cavity or slot within the robot 1.

The mobile robot 1 further comprises packages 20, 22. The packages 20, 22 are placed within the package space 10. They are schematically depicted in the figure as rectangular boxes, but can comprise any other shape. In some embodiments, packages 20, 22 can comprise mail, documents, groceries, take-out, packages, and/or other items to be delivered.

The mobile robot 1 further comprises at least one package sensor 30. The package sensor 30 can comprise one or a plurality of sensors. The package sensor 30 can be placed on a lid 40 of the mobile robot 1, on an inner wall of the package space 10, on the bottom surface of the package space 10, or anywhere else within the robot 1. The placement of the package sensor 30 can depend on its nature.

Figure 1B:
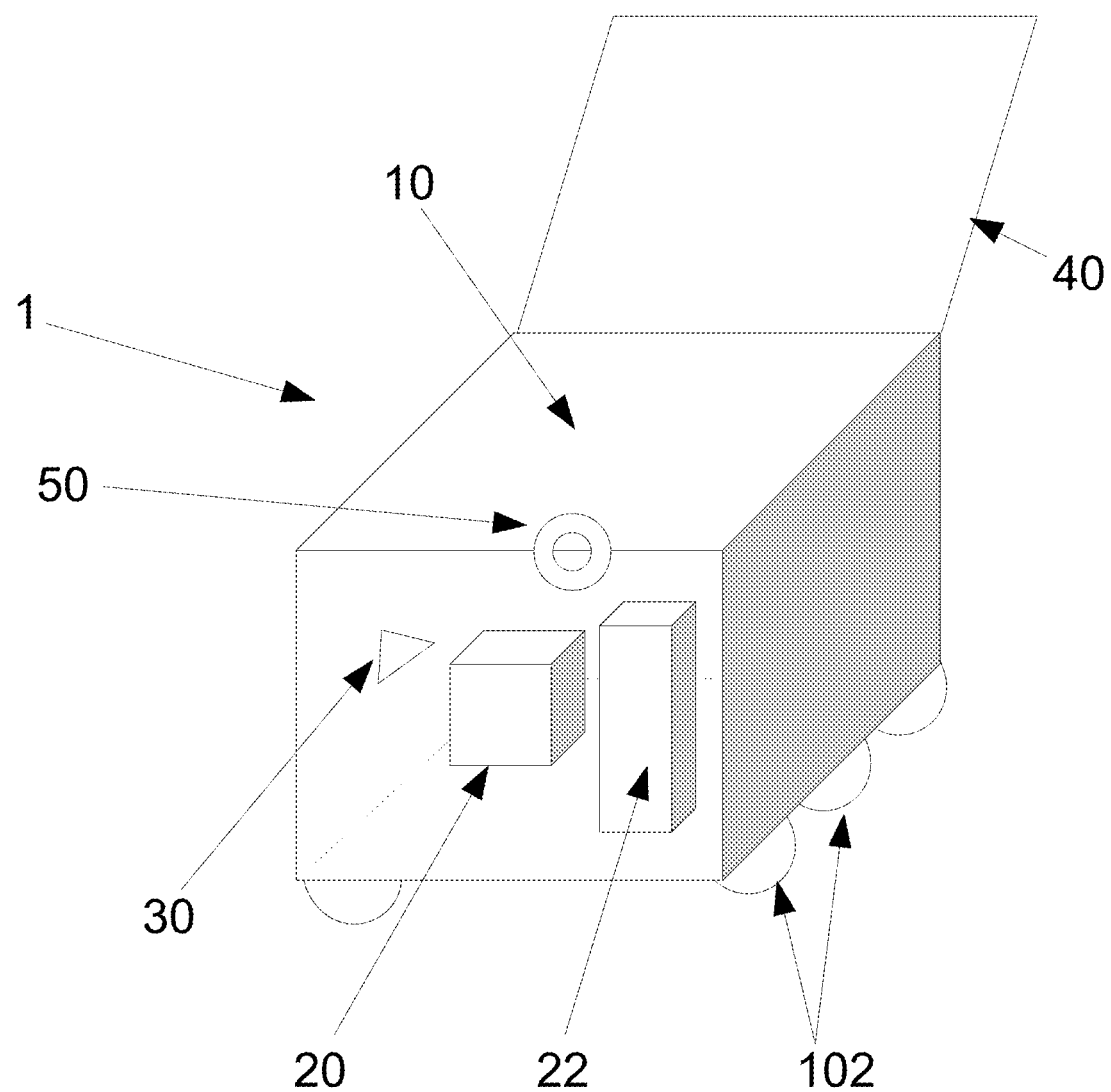

For example, in embodiments where the package sensor 30 comprises a visual camera 30, it can be advantageous to place the visual camera 30 on the inner surface of the lid 40. This is schematically demonstrated in FIG. 1a. In such embodiments, the visual camera 30 can also be placed on the inner wall of the package space 10, as schematically depicted in FIG. 1b. The visual camera 30 can be adapted to record an image and/or a series of images at certain time intervals, and/or before and after the package space 10 is accessed by the first delivery recipient 60. The images can either be processed by the robot 1, transferred to a server via the robot's communication component (not depicted), and/or conveyed to a remote terminal, for example operated by a remote operator (not depicted) to be evaluated. The remote operator can, for example, visually recognize that more than one package has been retrieved, or that a wrong package has been retrieved. Alternatively or additionally, the images from the visual camera 30 can be processed via machine vision to determine whether the correct package has been retrieved.

Figure 1C:
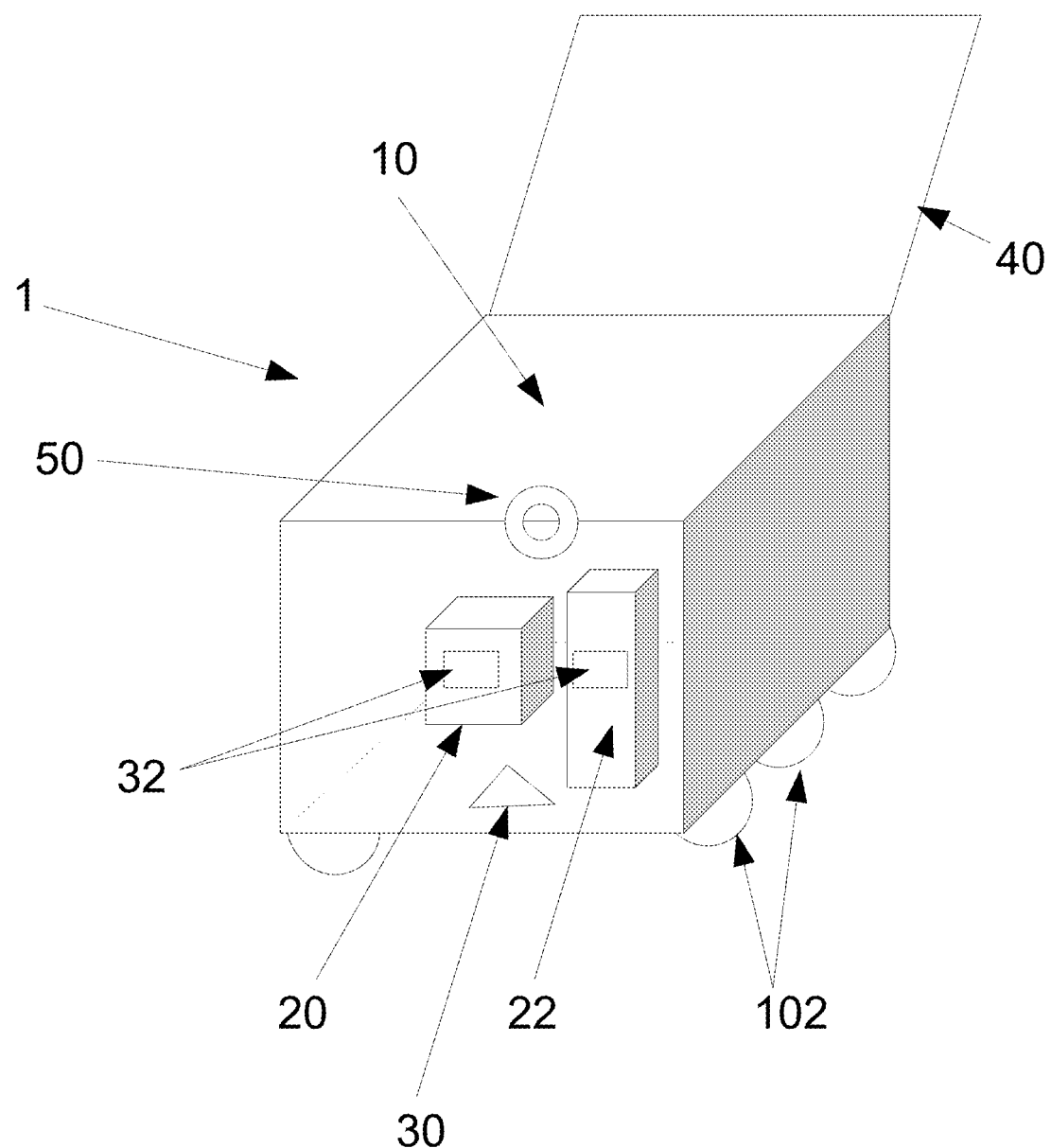

In other embodiments, the package sensor 30 can comprise a weight sensor 30. In such embodiments, the weight sensor 30 can be placed on the bottom surface of the package space 10 or under it within the robot 1. This is schematically depicted in FIG. 1c. The weight sensor can be adapted to weigh the package space 10 and determine which packages have been retrieved. For example, if package 20 weights 500 g and package 22 weights 2 kg, the weight sensor can determine which packages have been retrieved by weighing the package space 10 before and after the first delivery recipient gains access to the package space 10.

In other embodiments, the package sensor 30 can comprise an RFID reader 30. In such embodiments, the packages 20, 22 can comprise RFID tags. The placement of the RFID reader 30 in such embodiments can vary. In such embodiments, the RFID reader can periodically verify that the packages with the correct RFID tags remain in the robot's package space 10.

In other embodiments, the package sensor 30 can comprise a motion sensor 30. Such motion sensor can be a passive infrared detector, a microwave detector, an ultrasonic detector or another motion sensor. Such motion sensor can be for example placed on the inner wall of the package space 10 as schematically depicted in FIG. 1b, on the floor of the package space 10 as depicted in FIG. 1c or elsewhere. In such embodiments, the motion sensor 30 can detect when a first delivery recipient (60) has retrieved a package from the package space 10. The motion sensor can be combined with other sensors, such as the weight sensor for more precise data acquisition.

Figure 1D:
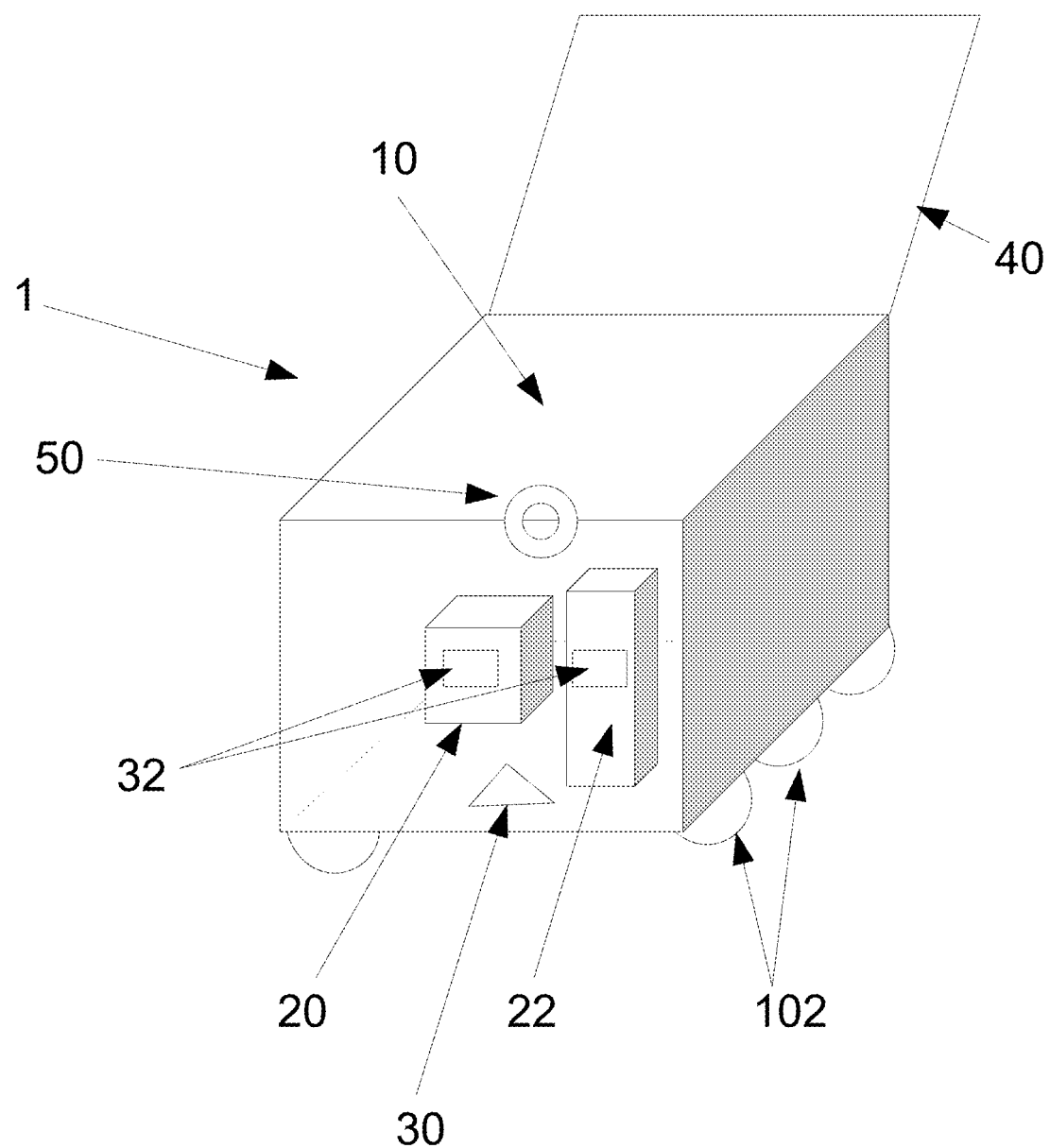

In some other embodiments, the packages 20, 22 can comprise a package ID 32, such as a QR code 32 or a barcode 32 placed directly on the packages 20, 22. This is schematically depicted in FIG. 1d. In such embodiments, the first delivery recipient (not depicted) can, for example, scan the code with a mobile device to confirm that the correct package 20, 22 has been retrieved. The package sensor 30 can also comprise a combination of sensors. For example, a combination of a weight sensor 30 and a package ID 32 can be used. In such embodiments, the first delivery recipient (not pictured) can be asked to scan a code on their package, and the robot can double check that only the package that was scanned was removed via weighing the package space 10 after package retrieval. Additionally or alternatively, a combination of a motion sensor 30 and a package ID 32 can be used. The motion sensor 30 can detect when the first delivery recipient retrieves a package 20, 22 and the first delivery recipient can then be asked to scan the package ID 32 on their mobile device. If the package ID 32 is not correct, the first delivery recipient can return the package 20, 22 to the package space 10 (which can be detected by the motion sensor 30) and then retrieve the correct package 20, 22 and scan it on their mobile device. The motion sensor 30 can also be combined with a weight sensor 30 allowing to implement a less sophisticated weight sensor 30. In this case, when the first delivery recipient retrieves the package 20, 22, the motion sensor 30 will detect this, and the weight sensor 30 can detect the weight difference and confirm that the correct package has been retrieved.

The mobile robot 1 can further comprise a lid 40. The lid 40 is adapted to cover the package space 10 during the robot's travelling from an initial location to the first delivery location. The lid 40 is adapted to protect the packages within the package space 10 from the elements, that is from rain, snow, sun, hail, sand, dust or similar, as well as from theft, vandalism and/or damage. The robot 1 can further comprise a lock 50. The lock 50 can be an electronic lock. The lock 50 can be adapted to open when the delivery location is reached. For example, the lock 50 can be adapted to open when the robot detects that the delivery location is reached, via a GPS sensor and/or another sensor. Alternatively or additionally, the lock 50 can be adapted to open when the robot 1 receives an "open" input from an outside source. For example, the first delivery recipient (not pictured) can enter a code or a command on a mobile device that makes the lock 50 unlock. Alternatively or additionally, a remote terminal, preferably with a remote operator monitoring the robot (not shown), could give the command to unlock lock 50. A server (not pictured) communicating with a communication component of the robot could also give said command. The lock 50 can be adapted to lock again once the package has been retrieved by the first delivery recipient. The lock 50 is schematically depicted on the outer surface of the robot 1, but can also be placed on the inner or outer surface of lid 40, between the lid 40 and the package space 10 or elsewhere.

Figure 2A:
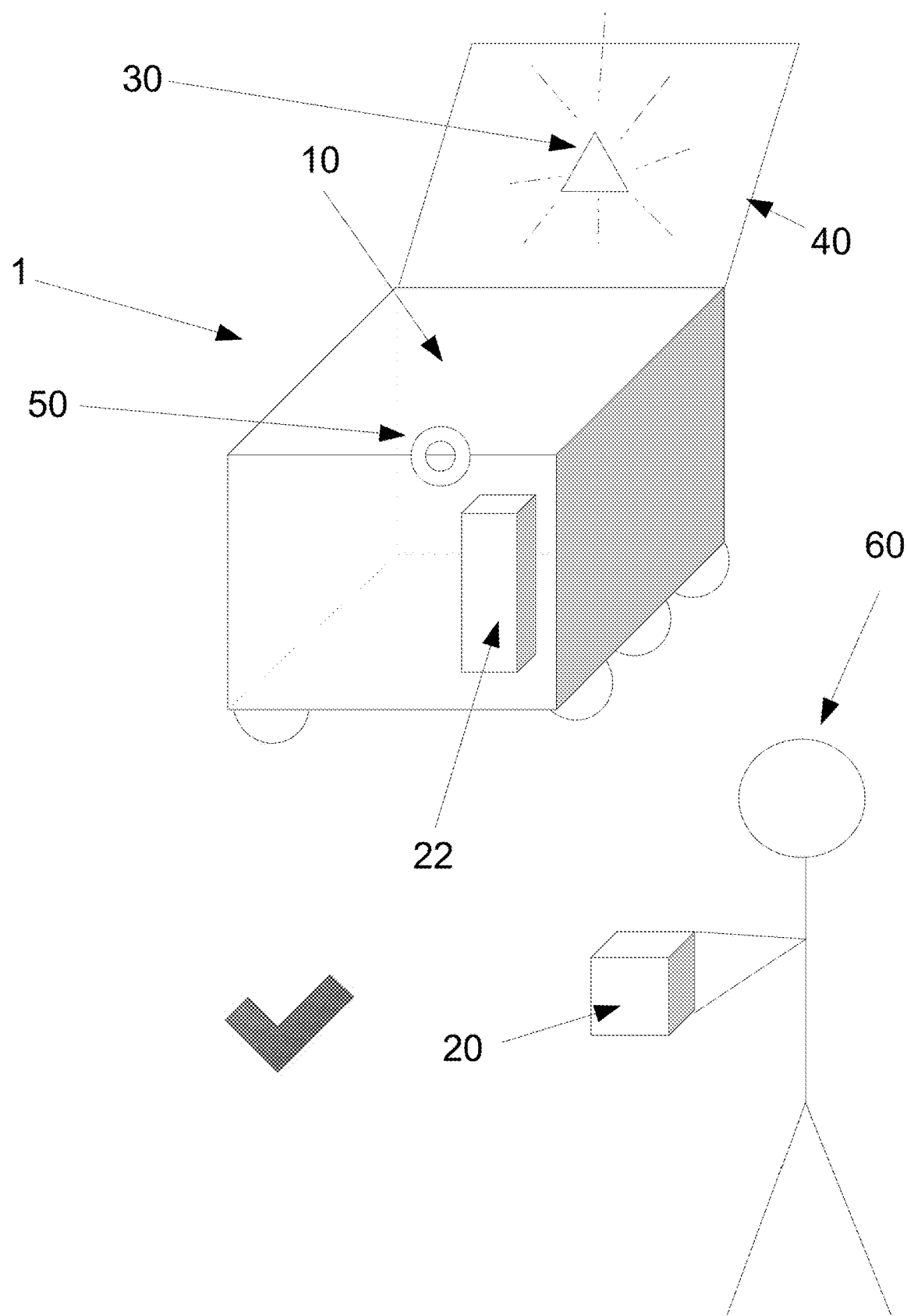
FIG. 2a, 2b depict an embodiment of a delivery method according to one embodiment of the invention.
Figure 2B:
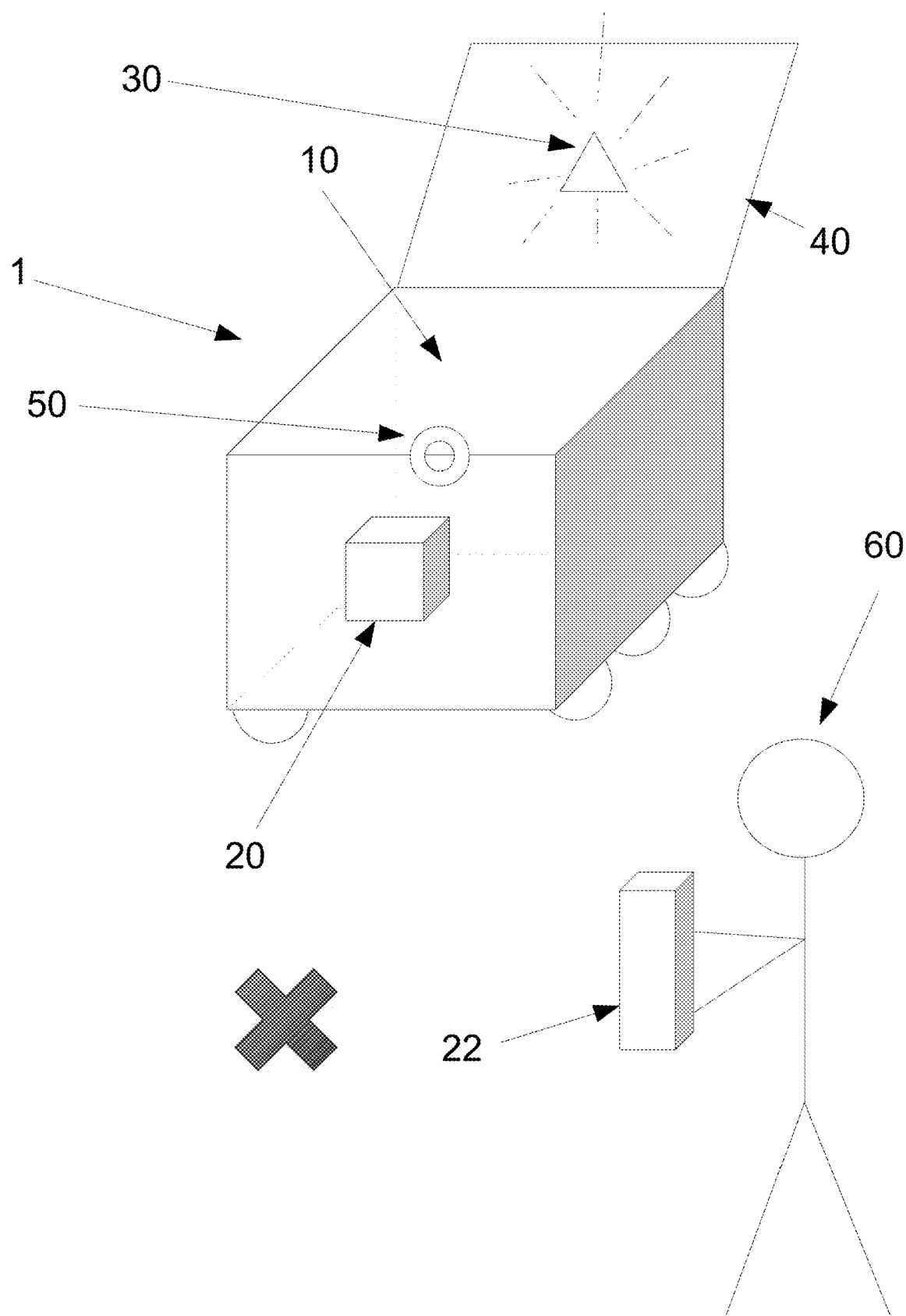

FIGS. 2a and 2b depict one embodiment of the package sensor 10 operating. In FIG. 2a, a first delivery recipient 60 has retrieved package 20 from the package space 10. The package sensor 30 detects that the first delivery recipient 60 has retrieved the correct package 20. In other words, package 20 is addressed to the first delivery recipient 60, but package 22 is not. The package sensor 30 can be adapted to detect that package 22, schematically representing all packages that are not addressed to the first delivery recipient 60, remains within the package space 10. The processing component of the robot (not depicted) can receive first data from the package sensor 30 and output that the correct package has been retrieved. The delivery process can thus be completed and the robot 1 can depart to deliver further packages 22.

In FIG. 2b, the first delivery recipient 60 retrieved package 22 instead of package 20 from the package space 10. This package is not addressed to the first delivery recipient 60. The package sensor 30 can then detect this and send the measurement data to the robot's processing component (not depicted). The processing component can then output that the wrong package has been retrieved. The first delivery recipient 60 can then be notified of the mistake and/or theft. For example, robot 1 can sound an alarm. Robot 1 can also transmit the notice of wrong package retrieval to a server and/or to a remote terminal (not depicted). The server and/or the remote terminal, or the remote operator can then contact the first delivery recipient 60 directly and/or through the robot. For example, the server and/or the remote operator can send a message to a mobile device of the first delivery recipient 60, can call it and/or use speakers on the robot to notify the first delivery recipient 60 that a wrong package has been retrieved. Once the mistake and/or theft is corrected and only the correct package is retrieved from the package space 10, the package can be completed, and the robot can proceed to travel to the next delivery location and/or elsewhere.

Figure 3:
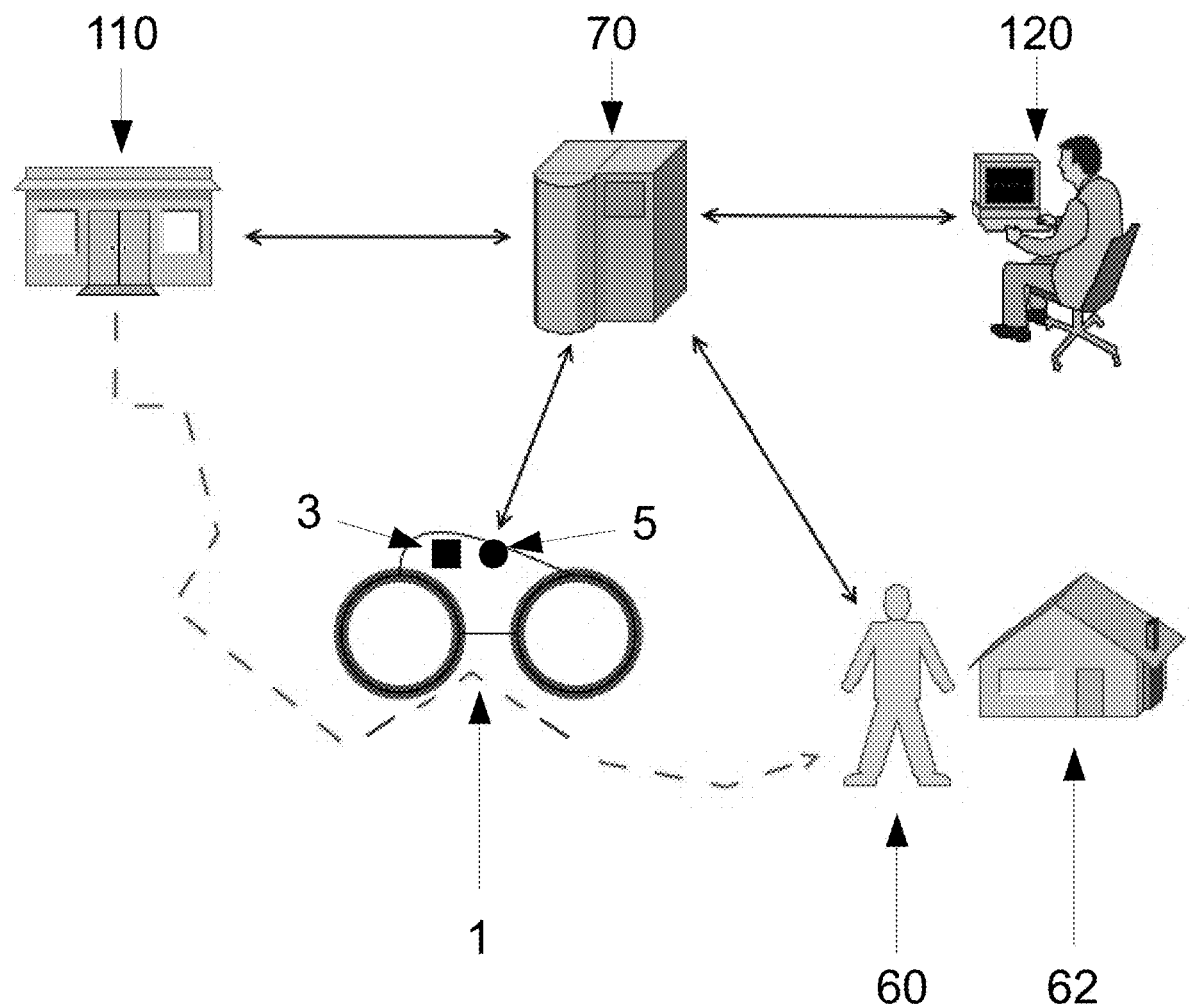
FIG. 3 depicts an embodiment of a delivery method according to one embodiment of the invention.

FIG. 3 depicts an embodiment of the communications in the secure delivery process according to one embodiment of the invention. Robot 1 can be adapted to travel from an initial location 110 to a first delivery location 62. In some embodiments, the initial location 110 can comprise a home base, or robot base or hub. In some embodiments, this is the location where the robot can be stored, maintained and/or loaded and/or unloaded.

The first delivery recipient 60 can be notified that the robot 1 has arrived at the delivery location 62 via a mobile device for example. This can be a cell phone, a tablet, a personal computer, a wearable device and/or a comparable device. In some embodiments, the first delivery recipient 60 can be notified of which package within the package space 10 of the robot 1 is addressed to them. This can be done, for example, by sending an image or a picture of the package space 10 with the correct package 20 highlighted or otherwise indicated on the image. This can be advantageous, as the first delivery recipient 60 would know which package 20 is addressed to them even before accessing the package space 10, which reduces the possibility of mistake when retrieving a package, and speeds up the delivery process.

The robot 1 can be adapted to communicate with a server 70 via a communication component 5. The server 70 can communicate with a remote terminal 120 and with the first delivery recipient 60. In some embodiments, the robot 1 can also directly communicate with the remote terminal 120 and/or with the first delivery recipient 60 via the robot's communication component 5.

When the robot's package sensor 30 (not depicted) detects first data indicating that a wrong package 22 (not depicted) has been retrieved, the robot 1 can process this via a processing component 3 and send this second data to the server 70 and/or to the remote terminal 120 for further processing and/or actions via the communication component 5. For example, the server 70 can send an automated message to the first delivery recipient 60 warning them that the wrong package has been removed. Alternatively or additionally, the remote terminal 120 can directly communicate with the first delivery recipient 60 via their mobile device for example in case of complications during the delivery process. The remote terminal 120 can, for example, supervise a plurality of mobile robots 1 simultaneously, ready to take action if a problem arises during the delivery process for one or a plurality of them. The remote terminal 120 can, for example comprise a remote operator, that is a person with a computing device.

In some embodiments, the first delivery recipient 60 can contact the server 70 and/or the remote terminal 120 if difficulty arises before, during or after the delivery process. For example, if they are unable to locate their package 20 (not shown) within the package space 10 (not shown), they can request automated or operator assistance.

It is understood from the foregoing that package sensor 30 can be adapted to measure first data reflective of the presence or absence of each of a plurality of packages 20, 22 in the package space 10, and the identity of each such package 20, 22 by virtue of the package ID 32 such as a barcode, a QR code or a similar code and/or other specific package characteristic such as dimensions, weight, visual characteristics, RF tags and so on. Thus, the processing component 3 and/or a server 70 that the robot is adapted to communicate with via its communication component 5, and thereby an operator at the initial terminal 110 and/or at the remote terminal 120, will know which package(s) is/are in the package space, at any given instant.

Figure 4:
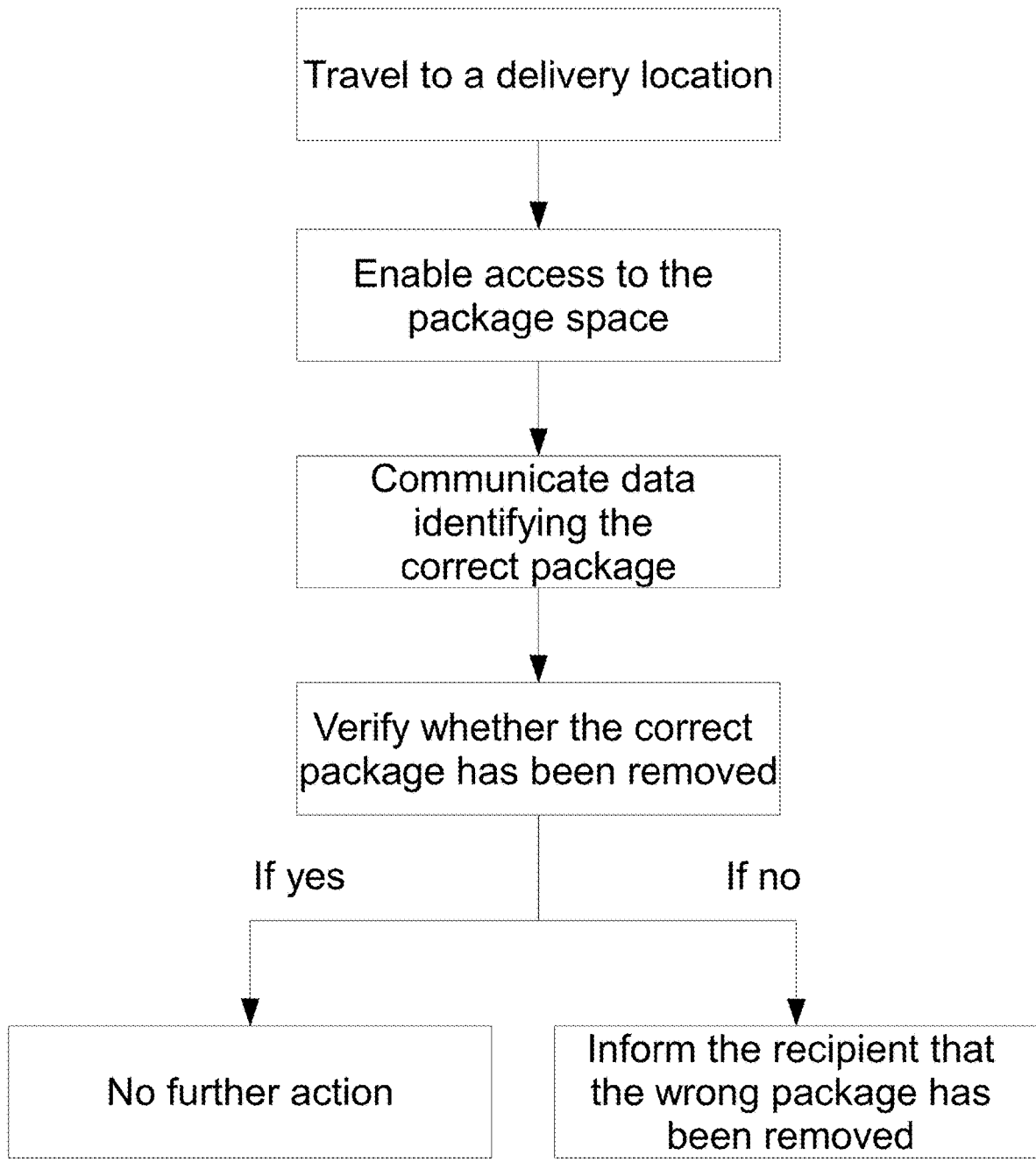
FIG. 4 depicts a flowchart of method of delivering packages according to one embodiment of the invention.

FIG. 4 shows a schematic embodiment of the delivery method according to one aspect of the invention. The robot 1 (not shown) can first travel from an initial location such as a robot home base, robot base and/or a hub to the delivery location 62 (not shown). The robot can then enable access to the package space 10 (not shown) for the first delivery recipient 60 (not shown). The robot 1 and/or the server 70 (not shown) and/or the remote terminal 120 (not shown) can communicate data identifying the correct package 20 (not shown) to the first delivery recipient. Note, that in general, the steps do not have to be performed in this order, and in particular, the step of identifying the correct package 20 to the first delivery recipient 60 can be done first.

The robot 1 can then verify whether the correct package 20 has been retrieved. That is, whether the retrieved package 20 is the one addressed to the first delivery recipient 60. This can be done via the package sensor 30 (not shown). If only the correct package 20 has been removed, the delivery process can terminate and the robot 1 can depart the delivery location 62. If the wrong package 22 has been retrieved, the robot 1 can then notify the first delivery recipient of the mistake via different options. The robot 1 can sound an alarm and/or the robot 1 can contact the server 70 and/or the remote operator 120 who can then contact the first delivery recipient 60 via their mobile device and/or via the robot 1 directly. Once the mistake has been rectified and only the correct package 20 retrieved from the robot's package space 10, the delivery process can terminate, and the robot 1 can depart the delivery location 62.

Figure 5:
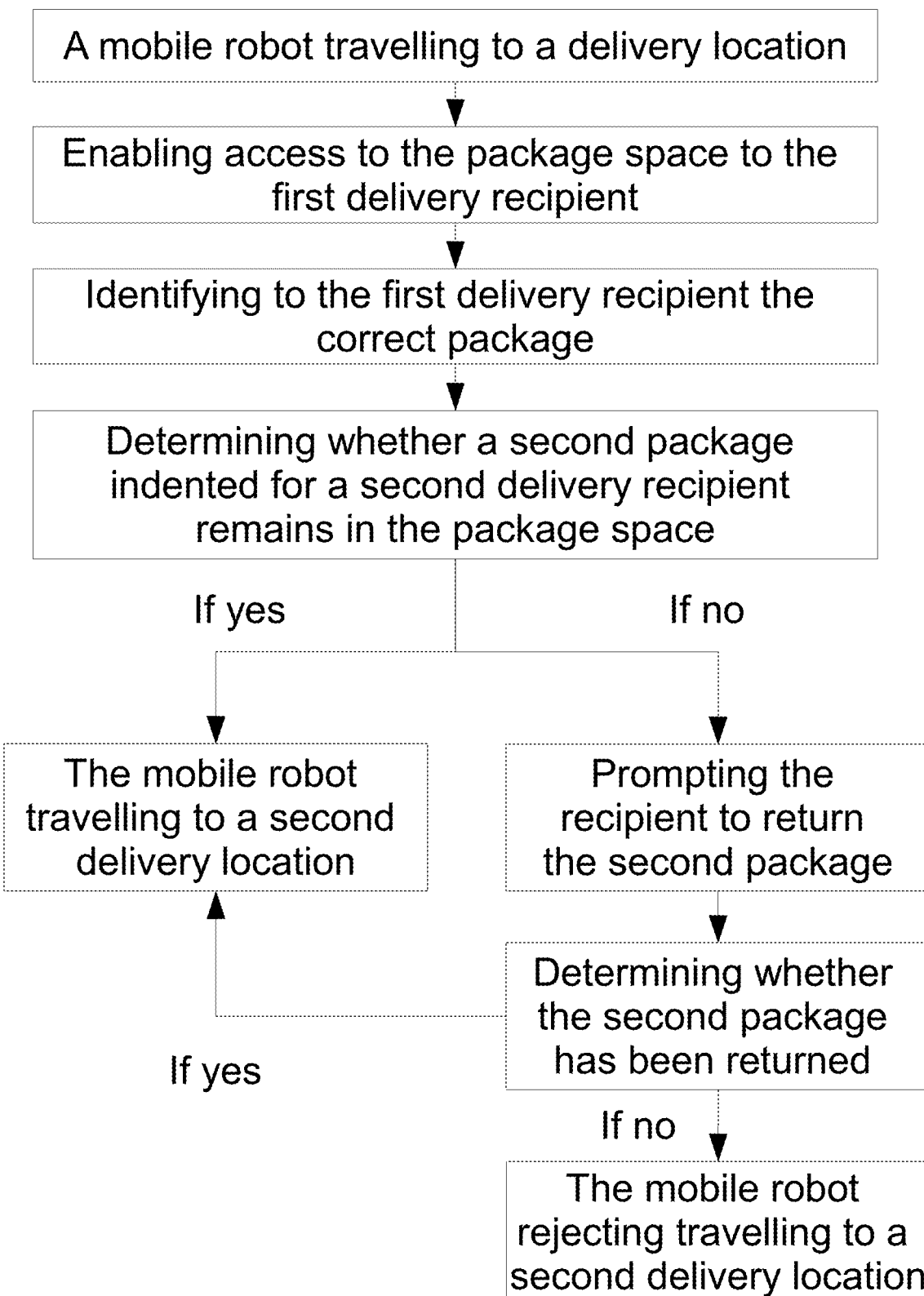
FIG. 5 depicts a flowchart of a delivery method according to one embodiment of the invention.

FIG. 5 depicts a flowchart of a delivery method according to one embodiment of the invention. As discussed above, the mobile robot can travel to a delivery location or a first delivery location. The robot can travel autonomously and/or semi-autonomously using a plurality of sensors for navigation and/or localisation. Once at the delivery location and/or a first delivery location, the access to the package space can be enabled—either by the robot itself and/or by a remote server and/or by a remote operator. The first delivery recipient can then have access to the package space. In practice, this can simply mean that an electronic lock is unlocked, and a lid covering the package space can now be opened in order to access the package space. The first delivery recipient can be the recipient of one of the packages in the robot's package space and/or a person authorized to receive the package. The correct package can first be identified to the first delivery recipient. As previously discussed, this can be done prior to the mobile robot arriving to the delivery location. For example, the first delivery recipient can be sent a picture or an image of the correct delivery either on its own or directly within the robot's package space (with the correct delivery clearly identified on the image). Additionally or alternatively, the correct delivery can be identified via a particular design, such as a colour, a picture and/or a symbol. For example, a sticker and/or a label identifying the package can be fixed to the outside. This can be preferable to a sticker and/or a label identifying the first delivery recipient for privacy reasons. Once the first delivery recipient removes a particular package from the package space, it can be checked whether the correct package has been removed. (as shown in FIG. 4)—This can be done by using the package sensor to obtain first data. This first data can then be processed and/or evaluated either by a processing component of the mobile robot, and/or by a remote server, and/or by a remote operator in order to determine whether the correct package has been removed. At this point, it can also be determined whether a second package intended for a second delivery recipient remains in the package space. That is, the first data obtained by the package sensor can be used not only to determine whether the correct package has been removed, but also to determine whether the second package remains in the package space. If the second package does remain in the package space, the mobile robot can proceed to travel to a second delivery location in order to deliver said second package. If, however, it is determined that the second package is not in the package space, the mobile robot can reject and/or abort travelling to a second delivery location. That is, in the case that the delivery recipient and/or a third party removed the second package, the robot can adjust the planned route by removing the second delivery location from it. Additionally or alternatively, the robot can request an input for further action from a remote server and/or from a remote operator. Note, that after determining that the second package is not within the package space, the robot and/or the server and/or the remote operator can inform the first delivery recipient and/or a third party that an unauthorized package has been removed in an attempt to recover said package. In this case, the process of verifying whether the second package remains in the package space can be repeated in order to determine whether it has been returned to the package space after a prompt to do so. If this is not the case after a certain number of potentially escalating prompts and/or a certain time interval, the robot and/or the server and/or the remote operator can then stop attempting to retrieve the second package and reject and/or abort travelling to a second delivery location. In this case, the robot can take several different courses of action. If a further package still remains within the package space, the robot can proceed to a further delivery location to deliver this package. If no further package is present, the robot can return to an initial location from which it started on its delivery route and/or return to a different final location according either to a pre-planned route and/or according to further instructions from the server and/or from the remote operator.

Note, that in the specific embodiments discussed in relation to figures, elements pertaining to a device and elements pertaining to a method were discussed. As the present invention describes both a device and a method for secure package delivery, elements relating to the device can be part of the method and elements pertaining to the method can be part of the device.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

What is claimed is:

1. A mobile robot delivery method for delivering a first package to a first delivery recipient at a first delivery location and then delivering a second package to a second delivery recipient at a second delivery location, without reloading the mobile robot between delivery locations, the method comprising:
   (i) providing a mobile robot (1) comprising at least one package space (10) containing at least said first and second packages (20, 22) for delivery, at least one package sensor (30), at least one processing component (3) and at least one communication component (5);
   (ii) the mobile robot (1) travelling to the first delivery location;
   (iii) enabling the first delivery recipient (60) to access to the package space (10);
   (iv) verifying with the at least one package sensor (30) that the first delivery recipient (60) removed only the first package (20);
   (v) determining whether the second package (22) remains in the package space (10); and
   (vi) the mobile robot (1) travelling to the second delivery location only if the second package (22) remains in the package space (10).

2. The method according to claim 1, further comprising identifying to the first delivery recipient (60) the first package (20) that the first delivery recipient (60) is authorized to remove from the package space (10).

3. The method according to claim 2, wherein said step of identifying comprises one or more of:
   (i) sending the first delivery recipient (60) an image of the package space (10) with the first package (20) clearly indicated and/or identified;
   (ii) sending the first delivery recipient (60) an image of the first package (20); and (iii) visually identifying the first package (20) with a graphical sign and communicating said sign to the first delivery recipient (60).

4. The method according to claim 1, wherein the step of travelling to a first delivery location comprises the mobile robot (1) semi-autonomously and/or autonomously driving from an initial location to the first delivery location.

5. The method according to claim 1, wherein the step of verifying with the package sensor (30) that only the first package (20) has been removed comprises one or more of:
(i) weighing the package space (10) with a weight sensor prior to and/or after the removal of the package (20, 22) by the first delivery recipient (60);
(ii) taking visual images of the package space (10) with a visual camera prior to and after the removal of the package (20, 22) by the first delivery recipient (60); and transferring visual images to a remote terminal and/or to a computer vision system to identify whether the correct package has been removed;
(iii) scanning the package space (10) with an RFID scanner, equipped on the mobile robot (1) to determine whether only the first package (20) has been removed based on its RFID tag; and
(iv) detecting motion within the robot's package space (10) with at least one motion sensor.

6. The method according to claim 1, wherein the processing component (3) of the robot (1) is adapted to perform the step of verifying that only the first package (20) has been removed from the package space (10) using at least first data obtained by the package sensor (30).

7. The method according to claim 6, wherein:
the communication component (5) of the robot (1) is adapted to send first data obtained by the package sensor (30) to a server (70), and
the server (70) is adapted to analyze said first data to verify that only the first package (20) has been removed from the package space (10).

8. The method according to claim 1, further comprising the step of:
informing the first delivery recipient (60) that they removed a wrong package, if the package sensor (30) outputs first data indicating that the second package (22) has been removed by the first delivery recipient (60).

9. The method according to the claim 8, wherein informing the first delivery recipient (60) comprises one or more of:
(i) activating an alarm, and/or playing a recorded message;
(ii) sending a communication to a mobile device of the first delivery recipient;
(ii) calling the first delivery recipient's mobile device and playing a recorded message;
(iv) calling the first delivery recipient's mobile device and connecting them with a remote operator (120); and
(v) activating a speaker on the robot (1) through which a remote operator (120) can communicate with the first delivery recipient (60).

10. The method according to claim 1, further comprising, upon determining that the second package (22) has been removed from the package space (10) by the first delivery recipient (60),
(i) prompting the first delivery recipient (60) to return the second package (22) and
(ii) determining, via the package sensor (10), whether the second package (22) has been returned to the package space (10).

11. A mobile robot (1) adapted to deliver a first package (20) to a first delivery recipient (60) at a first delivery location prior to delivering a second package (22) to a second delivery recipient at a second delivery location, without reloading the robot between delivery locations, said robot (1) comprising:
at least one package space (10) holding at least said first package (20) and said second package (20);
at least one package sensor (30) configured to measure first data reflective of the presence or absence of at least one of the packages;
at least one processing component (3) configured to receive and process the package sensor's (30) first data; and
at least one communication component (5) configured to send and receive second data;
wherein:
the processing component (3) and/or a server (70) with which the robot (1) is adapted to communicate, is adapted to determine whether the first delivery recipient (60) retrieved the second package (22) and take action comprising one or more of:
(i) activating an alarm on the robot (1);
(ii) playing a recorded message on the robot (1);
(iii) sending a message to the first delivery recipient's mobile computing device;
(iv) calling the first delivery recipient's mobile device and playing a recorded message;
(v) calling the delivery recipient's mobile device and connecting them with a remote terminal (120) directly; and
(vi) activating a speaker on the robot (1) through which a remote terminal (120) can communicate with the first delivery recipient (60) via the mobile robot's (1) communication component (5).

12. The mobile robot according to claim 11, wherein the package sensor (30) is adapted to measure first data relating any packages (20, 22) removed from the package space (10) and/or first data relating to the any packages (20, 22) remaining within the package space (10).

13. The mobile robot (1) according to claim 11, wherein the at least one package sensor (30) is configured to measure first data reflective of the presence or absence of each of a plurality of packages in the package space, and the identity of each such package.

14. The mobile robot (1) according to claim 11, wherein the processing component (3) is adapted to determine whether only the first package (20) has been removed from the package space (10) at the first delivery location.

15. The mobile robot (1) according to claim 11, wherein:
the mobile robot's communication component (5) is adapted to communicate with at least one external server (70) and exchange second data relating to the packages (20, 22);
the communication component (5) is adapted to send the package sensor's first data to the server (70); and
the server (70) is adapted to determine whether only the first package (20) has been removed from the package space (10) at the first delivery location and send a result of said determination to the robot's communication component (5).

16. The mobile robot (1) according to the claim 15, wherein the server (70) is further adapted to send at least one command to the mobile robot (1) via the mobile robot's communication component (5), said at least one command based at least partially on the package sensor's (30) first data.

17. The mobile robot (1) according to claim 11, wherein:
the communication component (3) is adapted to exchange the package sensor's first data with at least one remote terminal (120), and
the remote terminal (120) is adapted to determine whether only the first package (20) has been removed from the package space (10) at the first delivery location.

18. The mobile robot (1) according to claim 11, wherein the package sensor (30) comprises one or more of:
(i) at least one camera adapted to at least take visual images of the package space (10);
(ii) at least one RFID (Radio Frequency Identification) reader configured read RFID tags attached to the packages (20, 22);
(iii) at least one weight sensor adapted to weigh the contents of the package space (10); and
(iv) at least one motion sensor configured to detect removal of at least one of the packages (20, 22) based on a package ID (32) attached to each of the package (20, 22).

19. The mobile robot (1) according to claim 11, wherein the mobile robot (1) and/or a server (70) with which the robot (1) is adapted to communicate, is adapted to identify the first package (20) to the first delivery recipient (60).

20. The mobile robot (1) according to claim 19, wherein the identification comprises at least one or more of:
(i) sending an image of the package space (10) with the first package (20) indicated to the first delivery recipient (60);
(ii) sending the first delivery recipient (60) an image of the first package (20); and
(iii) visually identifying the first package (20) with a graphical sign and communicating said sign to the first delivery recipient (60).

21. A mobile robot (1) adapted to deliver a first package (20) to a first delivery recipient (60) at a first delivery location prior to delivering a second package (22) to a second delivery recipient at a second delivery location, without reloading the robot between delivery locations, said robot (1) comprising:
at least one package space (10) holding at least said first package (20) and said second package (20);
at least one package sensor (30) configured to measure first data reflective of the presence or absence of at least one of the packages;
at least one processing component (3) configured to receive and process the package sensor's (30) first data; and
at least one communication component (5) configured to send and receive second data;
wherein the processing component (3) is further configured to:
(i) navigate the mobile robot to the first delivery location;
(ii) enable the first delivery recipient (60) to access the package space (10);
(iii) identify to the first delivery recipient (60) the first package (20) that the first delivery recipient (60) is authorized to remove from the package space (10);
(iv) verify, with the at least one package sensor (30); that the first delivery recipient (60) removed only the first package (20);
(v) determine whether the second package (22) intended for the second delivery recipient remains in the package space (10); and
(vi) navigate the mobile robot to the second delivery location only if the second package (22) is still in the package space (10).

22. A mobile robot (1) adapted to deliver a first package (20) to a first delivery recipient (60) at a first delivery location prior to delivering a second package (22) to a second delivery recipient at a second delivery location, without reloading the robot between delivery locations, said robot (1) comprising:
at least one package space (10) holding at least said first package (20) and said second package (20);
at least one package sensor (30) configured to measure first data reflective of the presence or absence of at least one of the packages;
at least one processing component (3) configured to receive and process the package sensor's (30) first data; and
at least one communication component (5) configured to send and receive second data; wherein the processing component is further configured to:
determine whether the second package (22) has been removed from the delivery space (1), when the mobile robot is at the first delivery location; and
upon determining that the second package (22) has been removed from the delivery space (10) at the first delivery location;
(i) prompt the first delivery recipient (60) to return the second package (22); and
(ii) determine, based on further first data obtained by the package sensor (30), whether the second package (22) has been returned to the package space (10).

\* \* \* \* \*